US008527600B2

(12) United States Patent  (10) Patent No.: US 8,527,600 B2
Kakuta et al.  (45) Date of Patent: Sep. 3, 2013

(54) PRESENCE MANAGING METHOD AND APPARATUS

(75) Inventors: Jun Kakuta, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1296 days.

(21) Appl. No.: 11/392,625

(22) Filed: Mar. 30, 2006

(65) Prior Publication Data

US 2007/0124158 A1  May 31, 2007

(30) Foreign Application Priority Data

Nov. 30, 2005 (JP) .................................. 2005-345214

(51) Int. Cl.
 *G06F 15/16* (2006.01)
(52) U.S. Cl.
 USPC ............................ 709/207; 709/205; 709/206
(58) Field of Classification Search
 USPC ................. 709/228, 229, 204, 205, 206, 224, 709/225, 203; 707/4
 See application file for complete search history.

(56) References Cited

U.S. PATENT DOCUMENTS

| 7,110,999 | B2 * | 9/2006 | Colby et al. ....................... 707/4 |
| 2003/0217142 | A1 * | 11/2003 | Bobde et al. ................... 709/224 |
| 2004/0003037 | A1 * | 1/2004 | Fujimoto et al. ............... 709/203 |
| 2004/0172481 | A1 * | 9/2004 | Engstrom ....................... 709/239 |
| 2004/0249846 | A1 * | 12/2004 | Randall et al. ................. 707/102 |
| 2005/0228895 | A1 * | 10/2005 | Karunamurthy et al. ...... 709/229 |
| 2005/0235038 | A1 * | 10/2005 | Donatella et al. .............. 709/206 |
| 2005/0262195 | A1 * | 11/2005 | Ono et al. ....................... 709/203 |
| 2006/0167978 | A1 * | 7/2006 | Ozugur et al. ................. 709/203 |
| 2007/0198725 | A1 * | 8/2007 | Morris ........................... 709/227 |

FOREIGN PATENT DOCUMENTS

| JP | 2004-072485 | 3/2004 |
| JP | 2004-348680 | 12/2004 |
| WO | 02/093959 | 11/2002 |
| WO | 2005/096592 | 10/2005 |

OTHER PUBLICATIONS

European Search Report issued in corresponding European Patent Application No. 06251677.8-2221 on Apr. 25, 2007.
Chinese Office Action issued Apr. 8, 2010 in corresponding Chinese Patent Application 200610079293.2.

* cited by examiner

*Primary Examiner* — Hieu Hoang
(74) *Attorney, Agent, or Firm* — Staas & Halsey LLP

(57) ABSTRACT

It is an object of the present invention to relieve the burden on a watcher that uses a presence system to subscribe to the presence information of people and objects. For example, an attribute is a product name, and products A, B, C have the identical attribute value "DVDRecorder." The server generates aggregate presence information, which includes the presence information of the products A, B, C (corresponds to the providers), and sends a notification of such to a watcher W (corresponds to the notification recipient) of the presence information of the products A, B, C. The watcher W collectively receives the presence information for every product name, and the watcher W is therefore relieved of the burden of classifying the presence information for every product name.

18 Claims, 23 Drawing Sheets

| SUBSCRIBEE ID | PRESENCE INFO. | WATCHER ID |
|---|---|---|
| Item1 | <product >DVDRecorder</product >in stock | User1 |
| Item2 | <product >DVDRecorder</product >sale completed | User1 |
| | | User2 |
| Item4 | <product >Digital Camera</product >goods received | User2 |
| Item10 | <product >DVDRecorder</product >in transport | User3 |
| | | User1 |
| User1_DVDRecorder | | User1 |

Fig. 4

SUBSCRIBE SCREEN

Enter the buddy ID to be referenced and the display name in the product display area.

Buddy ID: _____
Display Name: _____

(Subscribe) (Cancel)

*Fig. 7*

NEW PRESENTITY REGISTRATION SCREEN

Enter the presentity (product info.) to be registered.

Presentity ID: _____
Initial presence: _____

(Register) (Cancel)

*Fig. 8*

AGGREGATION REQUEST SCREEN

Enter the aggregation target attribute.

Aggregation attribute

Minimum aggregation count

Aggregate    Cancel

*Fig. 9*

AGGREGATION CANCELLATION REQUEST SCREEN

Enter the attribute for which aggregation is to be canceled.

Aggregation attribute

Cancel aggregation    Cancel

*Fig. 10*

AGGREGATION RULE
```
<aggregate>
  <target id = "user1">
    <attribute name="product" value="DVDRecorder>
      <action type="auto" value="3"/>
    </attribute>
    <attribute name=" product" value="LcdTv>
      <action type="inquire" value="5"/>
    </attribute>
  </target>
  <target id="user2">
    <attribute name="product" value="DVDRecorder">
      <action type="inquire" value="15">
    </attribute>
  </terget>
</aggregate>
```

*Fig. 11*

AGGREGATION PERMISSION RULE
```
<aggregateControl>
  <target id = "item1">
    <attribute  name="product"  value="DVDRecorder>
      <action defaultAction="inquire">
        <allow id="user1" />
        <deny id="user9" />
      </action>
    </attribute>
    <attribute name="product" value="LcdTv>
      <action defaultAction="allow">
        <deny id="user2"'"/>
      </action>
    </attribute>
  </target>
</aggregateControl>
```

*Fig. 12*

```
<serviceProfile>
  <profile type="predefined" name="profile1">
   <bandwidth>narrow</bandwidth>
   <cost>high</cost>
  </profile>
  <profile type="userdefine" by="user1" name="user1_profile1">
   <bandwidth>broad</bandwidth>
   <cost>medium</cost>
  </profile>
</serviceProfile>
```

*Fig. 14*

```
<notifyMethod>
 <method type="predefined" name="method1">
  <when>
   <timing>constant</timing>
   <period unit="minute">30</period>
  </when>
  <what>
   <contents>updated</contents>
   <history numbers="10">latest</history>
  </what>
 </method>
 <method type="userdefine" by="user1" name="user1_method1">
  <when>
   <timing>after_lastupdate</timing>
   <period unit="minute">1</period>
  </when>
  <what>
   <contents>all</contents>
  </what>
 </method>
</notifyMethod>
```

*Fig. 15*

```
<unaggregate>
  <target id = "user1">
    <attribute name="product" value="DVDRecorder">
      <action type="auto" value="3"/>
    </attribute>
    <attribute name="product" value="LcdTv">
      <action type="inquire" value="5"/>
    </attribute>
  </target>
  <target id="user2">
    <attribute name="product" value="DVDRecorder">
      <action type="inquire" value="15"/>
    </attribute>
  </terget>
</unaggregate>
```

| SUBSCRIBEE ID | PRESENCE INFO. | WATCHER ID |
|---|---|---|
| Worker1 | <position>A City B Ward</position>in transit to customer | Manager1 |
| Worker2 | <position>C City D District</position>dealing with customer | Manager1 |
| Worker3 | <position>C City D District</position>standing by | Manager1 |
| Worker4 | <position>E City F District</position>in transit | Manager1 |
| Worker5 | <position>A City B Ward</position>dealing with customer | Manager1 |
| Worker6 | <position>C City D District</position>dealing with customer | Manager1 |
| Manager1_CD | | Manager1 |

Fig. 21C

| SUBSCRIBER ID | AGGREGATION ATTRIBUTE | AGGREGATE PRESENTITY ID | AGGREGATION TARGET PRESENTITY ID |
|---|---|---|---|
| Manager1 | C City D District | Manager1_CD | Worker2 |
| | | | Worker3 |
| | | | Worker6 |

| SUBSCRIBER ID | BUDDY ID |
|---|---|
| Manager1 | Worker1 |
| | Worker2 |
| | Worker3 |
| | Worker4 |
| | Worker5 |
| | Worker6 |
| | Manager1_CD |
| | Manager1_AB |

*Fig. 22A*

| SUBSCRIBEE ID | PRESENCE INFO. | WATCHER ID |
|---|---|---|
| Worker1 | <position>A City B Ward</position>in transit to customer | Manager1 |
| Worker2 | <position>C City D District</position>dealing with customer | Manager1 |
| Worker3 | <position>C City D District</position>standing by | Manager1 |
| Worker4 | <position>A City B Ward</position>in transit | Manager1 |
| Worker5 | <position>A City B Ward</position>dealing with customer | Manager1 |
| Worker6 | <position>C City D District</position>dealing with customer | Manager1 |
| Manager1_CD | | Manager1 |
| Manager1_AB | | Manager1 |

Fig. 22B

| SUBSCRIBER ID | AGGREGATION ATTRIBUTE | AGGREGATE PRESENTITY ID | AGGREGATION TARGET PRESENTITY ID |
|---|---|---|---|
| Manager1 | C City D District | Manager1_CD | Worker2 |
| | | | Worker3 |
| | | | Worker6 |
| | A City B Ward | Manager1_AB | Worker1 |
| | | | Worker4 |
| | | | Worker5 |

Fig. 22C

PRESENCE MANAGING METHOD AND APPARATUS

FIELD OF THE INVENTION

The present invention relates to a method of managing presence in a presence system.

BACKGROUND ART

A presence system is a system that manages the current status of presentities, such as people and objects, i.e., presence information. With a presence system, if the presence information of any presentity is updated, then watchers that have subscribed to the presence information of that presentity are notified of that presence information in real time.

In recent years, RFID technology, which can send and receive information without human intervention, has been coming into use in product management systems, such as distribution systems and inventory management systems. In conventional product management systems, information management is carried out in a proprietary fashion. However, it is expected that the presence systems would more and more applied to the product management. This is because presence system can manage current status of the product (or article) and notify updated information in real time.

Every time presence information is updated in a conventional presence system, the watcher is notified of that updated presence information. However, when trying to adapt a presence system to the management of product, the number of notifications of presence information increases enormously. Consequently, it is difficult for a watcher to efficiently manage presence information. For example, to efficiently manage products, a watcher must classify the presence information of the products by itself. In addition, the watcher must subscribe to the presence information of each of lots of products one by one. Consequently, there is a problem in that the burden on the watcher adversely increases.

Furthermore, there is a problem in that, if a watcher is notified of presence every time the presence information of lots of products updates, then the frequency of the notifications increases and the volume of information transmitted increases considerably, which increases the load on the network.

JP 2004-72485A discloses the technology of a presence notifying method, wherein all presence information is merged and transmitted every fixed time period if the presence information should be notified to the watcher.

SUMMARY OF THE INVENTION

In the invention of JP 2004-72485A, it is conceivable to achieve, to some extent, the effect of reducing the number of notifications of presence information, and of reducing the load on the network. One way that the technology recited in JP 2004-72485A achieves this is to merge updates of presence information of plurality of presentities per a watcher Consequently, from the perspective of the watchers, this results in receiving presence information which includes various kinds of presence information. Ultimately, this approach does not solve the problem wherein each watcher itself must classify the presence information for efficient management of the presence information. In addition, the burden of subscribing to the large quantity of products (or articles) one by one still remains.

It is an object of the present invention to relieve the burden on a watcher that uses a presence system to subscribe to the presence information of people and objects.

To solve the abovementioned problems, a first aspect of the present invention provides a presence managing method executed by a presence managing apparatus, which is connected to a plurality of clients. This method includes the following steps:

a managing step that receives presence information, which includes an attribute value, from the client, and associates and stores the provider client of the received presence information and the presence information;

a notification recipient managing step that stores a notification recipient management table, wherein the provider client of the presence information managed by the managing step and the notification recipient client of presence information of each provider client are associated;

an aggregating step that generates aggregate presence information that includes, of the presence information of a plurality of provider clients of which a notification is sent to the same notification recipient client, the presence information that has the identical attribute value; and an aggregation notifying step that notifies the notification recipient client of the aggregate presence information generated by the aggregating step.

This presence managing method is executed by a server in a presence system that includes a server and clients. Clients include presence providing apparatuses, presence information notification recipients, and the like. An attribute value is a value of one portion of the presence information. Specifically, product name, location, and the like can be cited as examples of a prescribed tag, but the prescribed tag is not particularly limited thereto.

This presence managing method functions as follows. For example, let us consider a case wherein the attribute is the product name, and products A, B, C have the identical attribute value "DVDRecorder." The server generates aggregate presence information, which includes the presence information of the products A, B, C (corresponds to the providers), and sends a notification including presence information of the products A, B and C to a watcher W (corresponds to the notification recipient). The watcher W collectively receives the presence information for the same product name, and the watcher W is therefore relieved of the burden of classifying the presence information for every product name.

According to a second aspect of the present invention, the notification recipient managing step accepts the registration of a new association of the provider client of the presence information managed by the managing step, and the notification recipient client of the presence information thereof, and further stores the accepted association in the notification recipient management table. In this aspect, the aggregating step comprises the substeps of: 1) extracting the attribute value included in the presence information of the provider client in the new association; 2) searching the notification recipient management table for an existing provider client, which is an existing provider client associated with the notification recipient client in the new association and wherein the extracted attribute value is included in the presence information thereof; and 3) generating aggregate presence information, which includes presence information of the searched existing provider client, and presence information of the new provider client. In addition, the aggregation notifying step notifies the new notification recipient client of the aggregate presence information.

With every new subscribing, presence information of existing buddies that has an attribute value identical to that of a new buddy is aggregated along with the presence information of the new buddy. This aggregation is executed for every watcher. Thereby, a watcher can be relieved of the burden of classifying buddies one by one.

According to a third aspect of the present invention, the managing step accepts the registration of a new client and the presence information thereof. In this method, the aggregating step comprises the substeps of: 1) specifying the provider client of presence information that has the same attribute value as that of the new client, and the notification recipient client of the presence information thereof; and 2) generating aggregate presence information, which includes presence information of the specified provider client and presence information of the new client. In this aspect, the aggregation notifying step notifies the notification recipient client specified by the aggregating step of aggregate presence information generated by the aggregating step.

When a new presentity and its presence information P1 are registered, the new presence information P1 is aggregated together with presence information P2, P3, . . . that has the same attribute value as the presence information P1. The notification recipients of the existing presence information P2, P3, . . . are notified of the aggregate presence information. In other words, even without subscribing to the presence information P1 of the new presentity, the watchers of the existing presence information P2, P3, . . . can refer the presence information P1 as a part of the aggregate presence information. Accordingly, if new presentities are registered one after the other, then the watcher is relieved of the burden of registering the buddies one by one.

According to a fourth aspect of the present invention, the aggregating step comprises the steps of: 1) accepting the specification of an aggregation condition, including an attribute value, from an arbitrary client; 2) specifying the provider client of presence information, from among presence information wherein the specifier client in the notification recipient management table is the notification recipient, that has the specified attribute value; and 3) generating aggregate presence information that includes presence information of the specified provider client. In this aspect, the aggregation notifying step sends notification of the generated aggregate presence information to the specifier client of the aggregation condition.

The specification of at least an attribute value is accepted from a watcher, and presence information, from among presence information of buddies of that watcher, that includes that attribute value is aggregated. Thereby, the watcher can easily classify buddies based on classification criteria of ones own liking.

According to a fifth aspect of the present invention, the managing step accepts an update of presence information from an arbitrary client. In this method, the aggregating step comprises the substeps of: 1) specifying the provider client of presence information that has an attribute value identical to the updated presence information; 2) specifying a notification recipient client associated with the specified provider client in the notification recipient management table; and 3) generating aggregate presence information, which includes presence information of the specified provider client, and the updated presence information. In addition, the aggregation notifying step sends notification of aggregate presence information generated by the aggregating step to the notification recipient client specified by the aggregating step.

Even if presence information is updated and the aggregate presence information changes dynamically, the notification recipient is notified of the latest aggregate presence information. Accordingly, even if the presence information changes dynamically, the watcher can monitor that change in units of the attribute.

According to a sixth aspect of the present invention, the aggregating step stores an aggregation information table that associates: the identical attribute value; the provider client of aggregation target presence information, which is presence information that has the identical attribute value; an identifier of aggregate presence information generated based on the aggregation target presence information; and the notification recipient client of the aggregate presence information. In this aspect, the managing step associates and manages: aggregate presence information generated by the aggregating step; and the identifier of the aggregate presence information.

Because aggregate presence information and the notification recipient thereof are stored in advance on the server side, aggregate presence information does not need to be saved or managed on the client side. Consequently, the burden on the watcher that refers the presence information provided from a large volume of clients is relieved. Furthermore, aggregate presence information itself does not necessarily need to be stored in the aggregation information table. For example, an aspect can be cited wherein the attribute value that constitutes the key for aggregation, the provider of presence information that has that attribute value, the identifier of aggregate presence information, and the like are associated with the notification recipient and stored.

According to a seventh aspect of the present invention, the presence managing method further comprises the step of a canceling step that comprises the substeps of: accepting the specification of any attribute value stored in the aggregation information table from an arbitrary client; and deleting from the aggregation information table the entry of the aggregate presence information, from among the aggregate presence information wherein the client is the notification recipient client, that has the specified attribute value.

According to a eighth aspect of the present invention, the aggregating step comprises the substeps of:

updating the aggregation information table if an attribute value of arbitrary presence information managed by the managing step changes;

judging whether the number of provider clients of presence information, which has an attribute value identical to the attribute value before the change in the presence information, has fallen below a prescribed value; and deleting the entry associated with the attribute value in said aggregation information table if it is judged that the number of said provider clients has fallen below the prescribed value.

If the amount of presence information that has the same attribute value becomes excessively small due to changes in presence information, then aggregation may be canceled because it is no longer meaningful to aggregate. In that case, it may be preferable to confirm this with the notification recipient of the aggregate presence information. Depending on the nature of the presence information, it may not be preferable to cancel aggregation while the watcher of the aggregate presence information is not informed.

According to a ninth aspect of the presence invention, the presence managing method further comprises the step of an aggregation permission acquiring step that transmits an inquiry regarding the appropriateness of aggregation to the provider client of presence information that has said identical attribute value prior to the generation of said aggregate presence information, and acquires the response to that inquiry. Moreover, the aggregating step generates aggregate presence information in accordance with the response acquired in the aggregation permission acquiring step.

From the perspective of the presentity, there is a risk that ones own presence information will unknowingly and unfortunately be provided as an aggregate presence information to a third party along with presence information of other presentities that has the same attribute value. Consequently, by inquiring with the provider of the presence information to be aggregated prior to aggregation, it is possible to protect the privacy of that provider.

An inquiry can be made for every aggregation. In addition, an inquiry can be sent about the aggregation permission rule, and, based on the response, the aggregation permission rule can be decided and the determination as to whether to execute aggregation may also be made based thereon.

According to a tenth aspect of the invention, the presence managing method further comprises the step of an aggregation permission acquiring step that transmits an inquiry concerning whether it is appropriate to aggregate to the notification recipient client of said aggregate presence information prior to the generation of said aggregate presence information, and acquires the response to that inquiry. Moreover, the aggregating step generates aggregate presence information in accordance with the response acquired in the aggregation permission acquiring step.

Viewed from the perspective of the watcher, it is possible to judge the need for aggregation by having an inquiry about whether to perform aggregation sent beforehand. The inquiry can be made with each aggregation. In addition, an inquiry about the aggregation permission rule can be sent and, based on the response thereto, the aggregation permission rule can be decided and the determination as to whether to execute aggregation may be made based thereon.

According to a eleventh aspect of the present invention, the presence managing method further comprises the step of a notification rule storing step that stores a notification rule, which defines a notification condition of aggregate presence information. Moreover, the aggregating step judges whether to generate aggregate presence information based on the notification rule.

A prescribed notification rule defines the notification conditions of the aggregate presence information, e.g., the generation condition of the aggregate presence information, the communication service used in the notification, and the notification timing. To cite examples of notification rules that stipulate generation conditions, there are "generate aggregate presence information 'every predetermined time period', 'every 5 changes in the aggregation target presence information', and the like." The notification rule may be prestored on the server. In addition, the specification of the notification rule may be accepted from a watcher, and the specified notification rule may be stored.

According to a twelfth aspect of the present invention, the presence managing method further comprises the step of: a notification rule storing step that stores the notification rule, which defines the notification condition of aggregate presence information. In this presence managing method, the aggregating step judges whether to generate aggregate presence information based on the notification rule. In addition, the aggregation notifying step judges whether to transmit the aggregate presence information based on the notification rule.

With the present invention, the generation condition and the notification timing of aggregate presence information is controlled based on the notification rule. To cite examples of notification rules that stipulate notification timing, there are "every predetermined time period, send a notification of the aggregate presence information" and "every time aggregate presence information is generated, send a notification of the generated aggregate presence information." If there is a large volume of presence information to be aggregated and if a notification of the aggregate presence information is sent every time each piece of presence information changes, then there is a risk that the frequency of notifications will increase excessively. Consequently, it is preferable to set the notification timing so that a notification of aggregate presence information is sent at appropriate intervals. Thereby, the monitoring load on the watcher and the load on the network can be reduced.

According to a thirteenth aspect of the present invention, the presence managing method further comprises the step of a notification rule storing step that stores the notification rule that defines a notification condition of aggregate presence information. Moreover, the aggregation notifying step judges whether to transmit the aggregate presence information based on the notification rule.

In the present invention, the transmission timing of aggregate presence information is controlled based on the notification rule.

A fourteenth aspect of the present invention provides a presence managing apparatus connected to a plurality of clients. This apparatus includes the following means:
  a managing means that receives presence information, which includes an attribute value, from the client, and associates and stores the provider client of the received presence information and the presence information;
  a notification recipient managing means that stores a notification recipient management table that associates the provider client of the presence information managed by the managing means and the notification recipient client of the presence information of each provider client;
  an aggregating means that generates aggregate presence information, which includes presence information, from among presence information of a plurality of provider clients for which a notification is to be sent to the same individual notification recipient client, that has the identical attribute value; and
  an aggregation notifying means that notifies the notification recipient client of aggregate presence information generated by the aggregating means.

The presence managing apparatus of the present invention executes the presence managing method of the first aspect.

A fifteenth aspect of the present invention provides a presence managing program that is executed by a computer connected to a plurality of clients. This program causes the computer to function as:
  a managing means that receives presence information, which includes an attribute value, from the client, and associates and stores the provider client of the received presence information and the presence information;
  a notification recipient managing means that stores a notification recipient management table that associates the provider client of the presence information managed by the managing means and the notification recipient client of the presence information of each provider client;
  an aggregating means that generates aggregate presence information, which includes presence information, from among presence information of a plurality of provider clients for which a notification is to be sent to the same notification recipient client, that has the identical attribute value; and
  an aggregation notifying means that notifies the notification recipient client of aggregate presence information generated by the aggregating means.

The program of the present invention causes a computer to execute the method as recited in the first aspect.

A sixteenth aspect of the present invention provides a computer readable recording medium whereon a presence managing program is recorded that causes a computer to function as a presence managing apparatus connected to a plurality of clients. This program causes the computer to function as:

a managing means that receives presence information, which includes an attribute value, from said client, and associates and stores the provider client of the received presence information and said presence information;

a notification recipient managing means that stores a notification recipient management table that associates the provider client of the presence information managed by said managing means and the notification recipient client of the presence information of each provider client;

an aggregating means that generates aggregate presence information, which includes presence information, from among presence information of a plurality of provider clients for which a notification is to be sent to the same notification recipient client, that has the identical attribute value; and an aggregation notifying means that notifies said notification recipient client of aggregate presence information generated by said aggregating means.

The present invention achieves the same operational effects as in the abovementioned fifteenth aspect.

A seventeenth aspect of the present invention provides a presence referring apparatus connected to a presence managing apparatus that manages and distributes presence information of a plurality of presence providing apparatuses, comprising:

a receiving means that receives said presence information, which includes an attribute value, from said presence managing apparatus; and a displaying means that classifies and displays said received presence information in accordance with said attribute value.

This presence referring apparatus is one aspect of a client of the first invention. The presence referring apparatus displays presence information and aggregate presence information so that they can be discriminated.

A eighteenth aspect of the present invention provides a presence referring program executed by a computer connected to a presence managing apparatus that manages and distributes presence information of a plurality of presence providing apparatuses. The program causes the computer to function as:

a receiving means that receives said presence information, which includes an attribute value, from said presence managing apparatus; and a displaying means that classifies and displays said received presence information in accordance with said attribute value.

The program of the present invention causes a computer to function as a presence referring apparatus of the seventeenth aspect.

A nineteenth aspect of the present invention provides a computer readable recording medium whereon is recorded a presence referring program executed by a computer connected to a presence managing apparatus that manages and distributes presence information of a plurality of presence providing apparatuses. The program causes the computer to function as:

a receiving means that receives said presence information, which includes an attribute value, from said presence managing apparatus; and a displaying means that classifies and displays said received presence information in accordance with said attribute value.

The present invention has the same operational effects as the eighteenth aspect.

According to the present invention, the presence information of a plurality of provider clients is aggregated by attribute and a notification thereof is sent, and it is therefore possible for a watcher to receive a notification including the updated presence information which has the same attribute value. Consequently, the burden on the watcher to classify the presence information it receives is relieved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

FIG. 4 is an explanatory diagram that depicts one example of a watcher list.

FIG. 7 is an explanatory diagram that depicts one example of a subscribe screen.

FIG. 8 is an explanatory diagram that depicts one example of a new presentity registration screen.

FIG. 9 is an explanatory diagram that depicts one example of an aggregation request screen.

FIG. 10 is an explanatory diagram that depicts one example of an aggregation cancellation request screen.

FIG. 11 is an explanatory diagram that depicts one example of an aggregation rule described in XML format.

FIG. 12 is an explanatory diagram that depicts one example of an aggregation permission rule described in XML format.

FIG. 14 is an explanatory diagram that depicts one example of a notification rule (communication service) described in XML format.

FIG. 15 is an explanatory diagram that depicts another example of a notification rule (notification timing) described in XML format.

FIG. 16 is an explanatory diagram that depicts one example of a presence aggregation cancellation rule described in XML format.

FIG. 21(b) is an explanatory diagram that depicts one example of a watcher list (before a change in the presence information) according to the second embodiment, and FIG. 21(c) is an explanatory diagram that depicts one example of an aggregation information table (before a change in the presence information) according to the second embodiment.

FIG. 22(a) is an explanatory diagram that depicts one example of a buddy list (after a change in the presence information) according to the second embodiment, FIG. 22(b) is an explanatory diagram that depicts one example of a watcher list (after a change in the presence information) according to the second embodiment, and FIG. 22(c) is an explanatory diagram that depicts one example of an aggregation information table (after a change in the presence information) according to the second embodiment.

DESCRIPTION OF THE PREFERRED EMBODIMENTS

Definition of Terms

The terms used in the presence system, which is explained in the embodiments below, will first be defined.

Presentity: A presentity is an entity that sets presence information and corresponds to a client in the embodiments below.

Watcher (Subscriber): A watcher is an entity that subscribes to the presence information of at least one other entity, and receives that presence information when it is updated. As the entity on the side that subscribes to the presence information of at least one other entity, which is the entity subscribed to, a watcher is sometimes called a subscriber.

Buddy (Subscribee): A buddy is the subscribed entity specified by the entity that wishes to subscribe to the presence information thereof. The entity on the subscribed side is sometimes called a subscribee.

Subscribe: Subscribing occurs when a certain entity refers the presence information of at least one other entity. More precisely, in order for a certain entity to have the presence information of at least one other entity distributed to itself, that certain entity registers itself as the watcher and the other entity as the buddy on the server within the presence system.

First Embodiment

Constitution

1. Overall System

Figure 1:
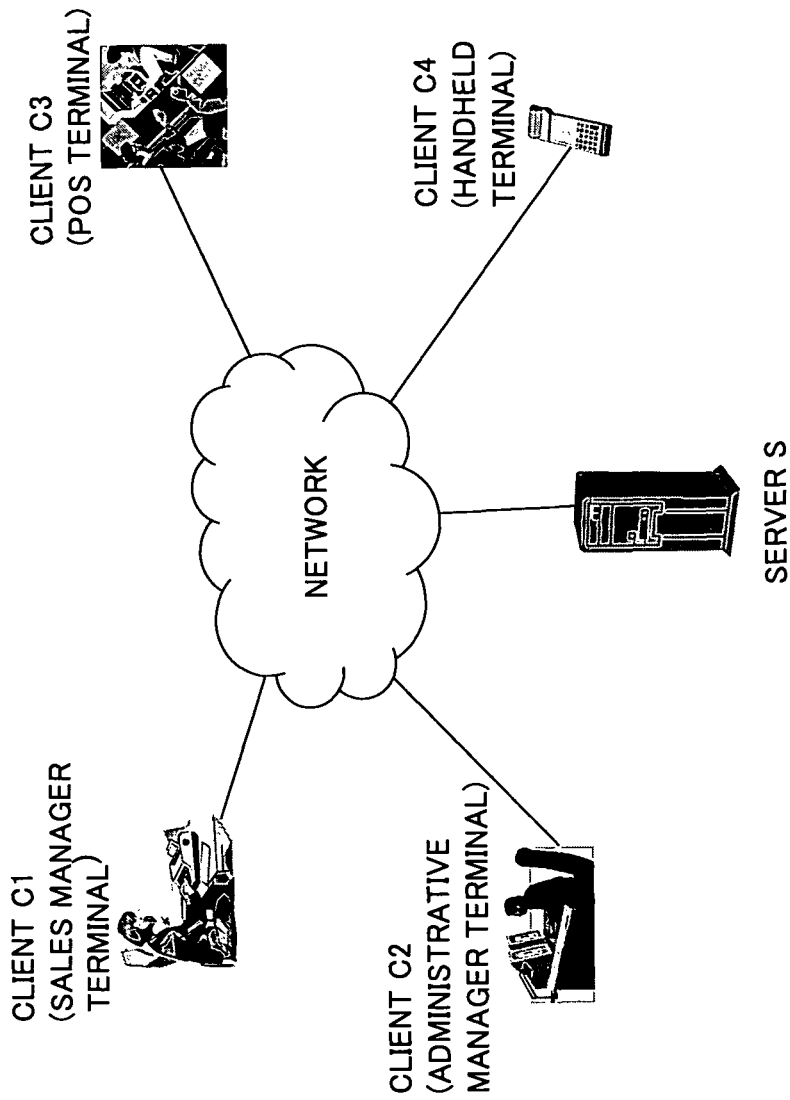
FIG. 1 is an explanatory diagram that depicts the constitution of a presence system according to the first embodiment.

FIG. 1 is an explanatory diagram that depicts the constitution of the presence system according to the first embodiment. The presence system comprises a server S and a plurality of clients C1, C2, C3, C4, . . . (hereinafter, recited simply as clients C). The server S and the clients C are connected via a network, such as the Internet or telephone lines. The server S and the clients C are both implemented by computer terminals.

The server S receives presence information from each of the clients C and stores the latest presence information thereof. In addition, the server S distributes the presence information to the clients C that are watchers thereof. In the present presence system, the presence information managed by the server S includes attribute values. Attribute values are part of the presence information. Examples that can be cited as attribute include product name, location, and name, but attribute values are not particularly limited. For example, an attribute value may be the name of a tag in data described in XML (eXtensible Markup Language) format that constitutes the presence information.

In the present presence system, a client ID is specified for each client. Hereinbelow, the client that provides presence information is called a presentity, and a client that refers the presence information of at least one other presentity is called a watcher. Furthermore, although a client may function as both a presentity and a watcher, it may also have only one such function. In addition, the ID of the client that is the presentity is called the presentity ID, and the ID of the client that is the watcher is called the watcher ID.

2. Server

Figure 2A:
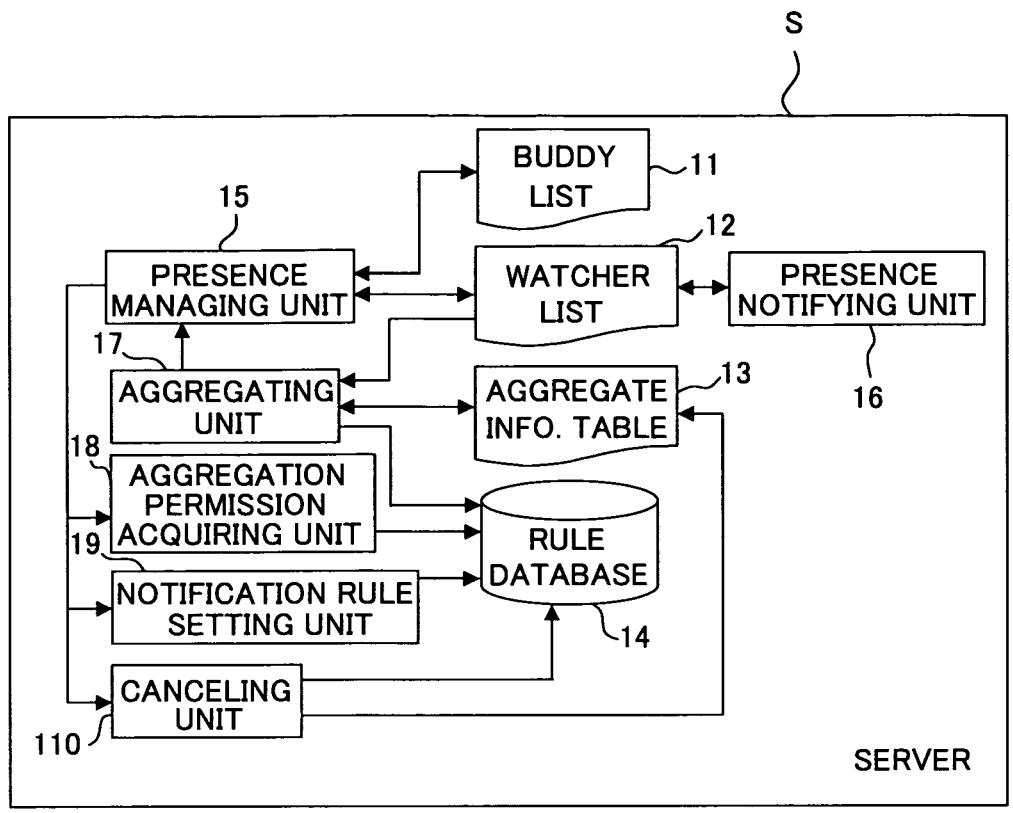
FIG. 2(a) is a block diagram that depicts the functions and constitution of the server S in FIG. 1.

FIG. 2(a) is a block diagram that depicts the functions and constitution of the server S. The server S has the following functions (a)-(j):

(a) buddy list 11
(b) watcher list 12
(c) aggregation information table 13
(d) rule database 14
(e) presence managing unit 15
(f) presence notifying unit 16
(g) aggregating unit 17
(h) aggregation permission acquiring unit 18
(i) notification rule setting unit 19
(j) canceling unit 110

The following discusses the details of each function.

(a) Buddy List

Figure 3:
FIG. 3 is an explanatory diagram that depicts one example of a buddy list.

FIG. 3 is an explanatory diagram that depicts one example of the buddy list 11. The buddy list 11 associates and stores "subscriber IDs" and "buddy IDs." A subscriber is a watcher of at least one other client, which is called a buddy. Hereinbelow, the client ID of a subscriber is simply called a subscriber ID. A buddy is a presentity to which a subscriber has subscribed. Hereinbelow, the client ID of a buddy is called a buddy ID. By a subscriber specifying and subscribing to a buddy ID, the subscriber ID and the buddy ID are associated and registered in the buddy list 11.

(b) Watcher List

FIG. 4 is an explanatory diagram that depicts one example of a watcher list 12. The watcher list 12 associates and stores (corresponding to a managing step and a notification recipient managing step) "subscribee IDs," the "presence information" of the subscribees, and "watcher IDs." A subscribee corresponds to a buddy in the abovementioned buddy list 11. The client ID of a subscribee is called a subscribee ID. A watcher corresponds to a subscriber in the abovementioned buddy list 11. The client ID of a watcher is called the watcher ID. When a subscriber ID and a buddy ID are registered in the buddy list 11, the buddy ID is registered as a subscribee ID in the watcher list 12, and the subscriber ID is registered as a watcher ID in the watcher list 12. The presence information is stored by the presence managing unit 15.

In the present invention, a virtual client ID, which is called an aggregate presentity and is apart from actual existing client IDs, is denoted as a subscribee ID. The aggregate presentity is the presentity of aggregate presence information. Aggregate presence information is the presence information of a plurality of presentities associated with the same watcher, and includes presence information that has the same attribute value. The present example describes a case wherein a watcher "User1" subscribes to the aggregate presence information of an aggregate presentity ID "User1_DVDRecorder."

Furthermore, in the present example, the watcher list 12 functions as a table that manages the presence information of the client specified by each subscribee ID.

(c) Aggregation Information Table

Figure 5:
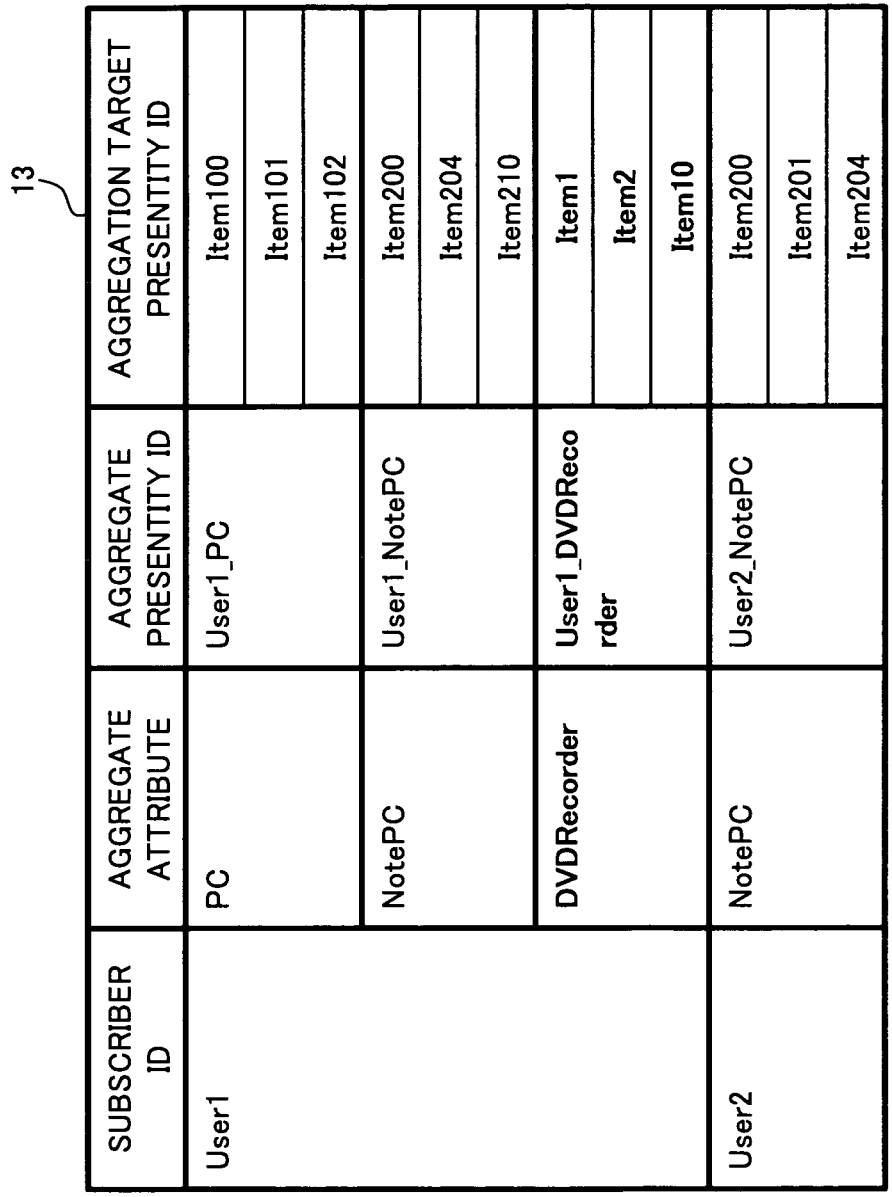
FIG. 5 is an explanatory diagram that depicts one example of an aggregation information table.

FIG. 5 is an explanatory diagram that depicts one example of the aggregation information table 13. The aggregation information table 13 associates and stores "subscriber IDs", "aggregation attributes", "aggregate presentity IDs", and "aggregation target presentity IDs."

A "subscriber ID" is the client ID of a watcher of aggregate presence information. An "aggregation attribute" is an attribute value that is common to the aggregated presence information In other words, among the presence information that a certain watcher is notified of, the presence information that has the identical attribute value is aggregated in the aggregate presence information. Hereinbelow, presence information that is aggregated in the aggregate presence information is called aggregation target presence information.

An "aggregate presentity ID" is an identifier that specifies an aggregate presentity that is a presentity of aggregate presence information. Each aggregate presentity ID is set so that it does not overlap any client ID.

An "aggregation target presentity ID" is a client ID that specifies an aggregation target presentity. An aggregation target presentity is a presentity of aggregation target presence information.

In this figure, among the presence information subscribed to by the watcher "User1," for example, the presentities of presence information that have the attribute values "DVDRecorder" are "Item1", "Item2", and "Item10". The presentity of aggregate presence information that includes the presence information of the presentities "Item1," "Item2," "Item10" is "User1_DVDRecorder." Accordingly, the watcher "User1" is notified of the aggregate presence information "User1_DVDRecorder" including presence information of the presentities "Item 1," "Item2," "Item 10."

(d) Rule Database

The rule database 14 stores the various rules. For example, the aggregation rules, aggregation permission rules, profile definitions, and notification rules are stored in the rule database 14. The details of each rule will be discussed later.

(e) Presence Managing Unit

The presence managing unit 15 receives an instruction to set presence information, which includes attributes, from an arbitrary client C, and writes such to the watcher list 12. Thereby, the latest presence information is held in the watcher list 12 (corresponds to the managing step). In addition, the presence managing unit 15 accepts requests to subscribe and requests to cancel a subscription from an arbitrary client C, and updates the buddy list 11 and the watcher list 12. The presence managing unit 15 can also accept the registration of a new client C from a client C operated by the administrator of the presence system. Furthermore, in the present embodiment, the presence managing unit 15 accepts from client C instructions to aggregate, instructions to cancel aggregation, and instructions of notification rules of aggregate presence information, and passes these accepted instructions to the aggregating unit 17, the canceling unit 110, and the notification rule setting unit 19.

More specifically, the presence managing unit 15 provides clients C with menu screens, submenu screens, and the like, and the setting of presence information, instructions to subscribe, and the like are accepted in these screens. Technologies, such as JavaScript®, VBScript, PerlScript, and the like are used to acquire the input content, to display the various screens on the client side, and the like. In addition, the drawing of the menu screens, the submenu screens, and the like can also be executed on the client C side. The timing for executing the drawing includes, for example, when a client C starts up, when a notification of the presence information is sent, when an instruction from the operator is accepted, and the like. With a presence system that requires real time performance, it is preferable to draw the screens on the client C side.

Figure 6:
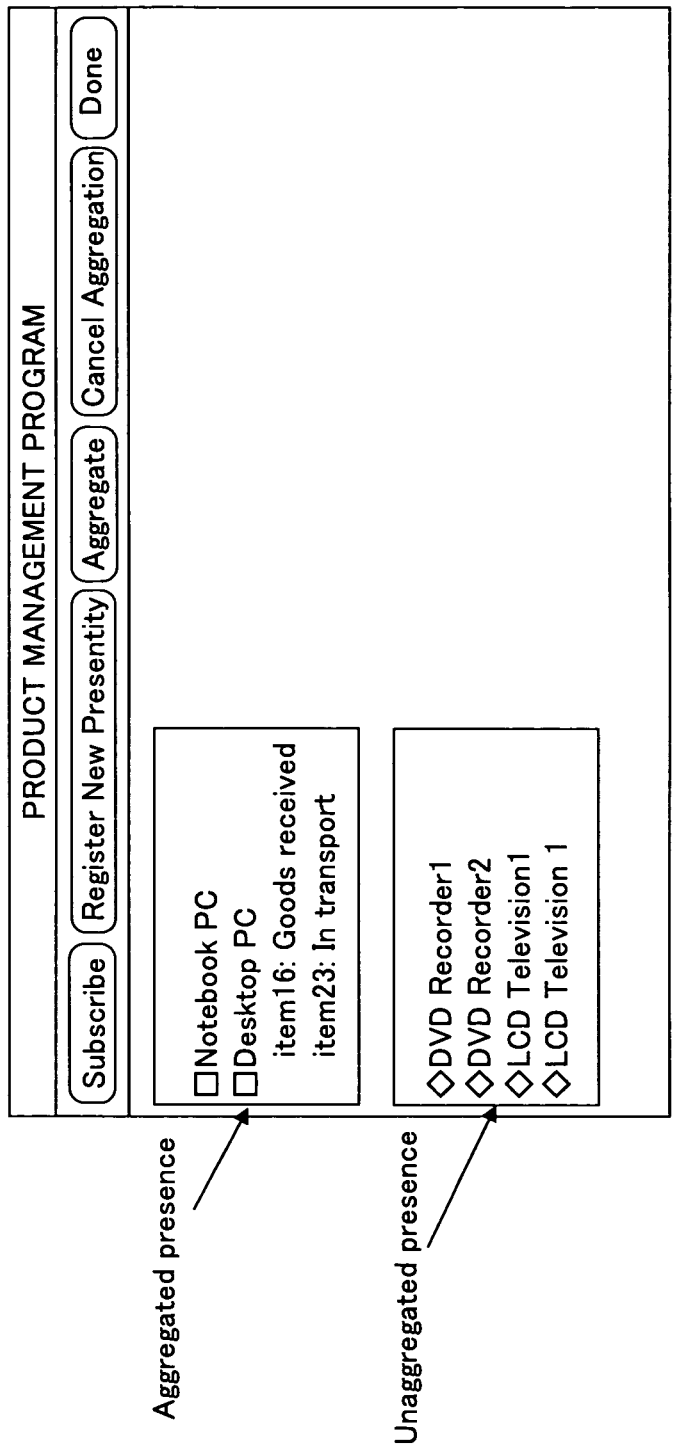
FIG. 6 is an explanatory diagram that depicts one example of a menu screen.

FIG. 6 is an explanatory diagram that depicts one example of a menu screen. The menu screen is an interface for accepting various instructions from the operator who operates the clients C, and accepts requests to subscribe, the registration of new presentities, and instructions to aggregate or cancel aggregation. Furthermore, only the client of the administrator of the presence system can click a "register new presentity button," which is preferable from the standpoint of the security of the presence system.

FIG. 7 is an explanatory diagram that depicts one example of a subscribe screen, which is one of the submenu screens. In the menu screen of FIG. 6, if the "subscribe button" is clicked, then the subscribe screen is displayed on the client side. This menu accepts at least the specification of a buddy ID. The accepted buddy ID along with the client ID, i.e., the subscriber ID, are transmitted from the client C to the server S. The presence managing unit 15 of the server S registers the received buddy ID and the subscriber ID in the buddy list 11 and the watcher list 12, respectively. Furthermore, the buddy ID is registered as a subscribee ID in the watcher list 12, and the subscriber ID is registered as a watcher ID in the watcher list 12.

FIG. 8 is an explanatory diagram that depicts one example of a new presentity registration screen, which is one of the submenu screens. If the "register new presentity button" in the menu screen of FIG. 6 is clicked, then the new user registration screen is displayed on the client side. This screen accepts at least the specification of the presentity ID and initial presence information. The accepted presentity ID and initial presence information are transmitted from the client C to the server S. The presence managing unit 15 of the server S generates a new entry in the watcher list 12, writes the value of the received presentity ID as a subscribee ID, and writes the initial presence information as presence information.

In a presence system wherein a single presentity can have presence information of a plurality of presentities, the registration of new presence information of an existing presentity can likewise be accepted.

FIG. 9 is an explanatory diagram that depicts one example of an aggregation request screen, which is one of the submenu screens. If the "aggregate button" in the menu screen of FIG. 6 is clicked, then the aggregation request screen is displayed on the client side. This screen accepts the specification of aggregation conditions, including at least an aggregation attribute value. The aggregation conditions may additionally include the minimum count of presence information to be aggregated, the setting of whether to automatically aggregate or to inquire before executing aggregation when the minimum aggregation count has been reached, and the like. This screen further accepts as an aggregation condition the specification of the minimum aggregation count. The accepted aggregation conditions and an aggregation request command are both transmitted from the client C to the server S. The presence managing unit 15 of the server S passes the received aggregation attribute values and minimum aggregation count to the aggregating unit 17. The aggregating unit 17 executes aggregation based on the passed aggregation attribute values, minimum aggregation count, and the like.

FIG. 10 is an explanatory diagram that depicts one example of an aggregation cancellation request screen, which is one of the submenu screens. If the "cancel aggregation button" in the menu screen in FIG. 6 is clicked, then the aggregation cancellation request screen is displayed on the client side. This screen accepts the specification of aggregate presence information to be canceled. As an example of this screen, the specification of an aggregation attribute value is accepted as the specification of aggregate presence information. The accepted aggregation attribute value, along with an aggregation cancellation command and the client ID, are transmitted from the client C to the server S. The presence managing unit 15 passes the received aggregation attribute value and the client ID to the canceling unit 110. The canceling unit 110 deletes the corresponding entry in the aggregation information table 13 based on the passed aggregation attribute value and the client ID.

(f) Presence Notifying Unit

The presence notifying unit 16 monitors the presence information written to the watcher list 12, and if any presence information is updated, then a notification of the updated presence information is sent to the watchers of that presence information. The presence information also includes aggregate presence information. Accordingly, if the aggregate presence information written in the watcher list 12 is updated, then the presence notifying unit 16 likewise notifies the watcher of the aggregate presence information of that aggregate presence information (corresponds to an aggregation notifying step).

The presence notifying unit 16 may send notification of the aggregate presence information in accordance with notification rules, which are discussed later. Thereby, the presence notifying unit 16 controls the communication service, which is used, for example, to send notification of aggregate presence information, as in (i) and (ii) below. In addition, the presence notifying unit 16 controls the timing for sending notification of aggregate presence information, as in (iii) and (iv) below.
  (i) Sending notification using a communication service CS1
  (ii) Sending notification using a communication service CS2
  (iii) Sending notification of aggregate presence information with any and every change in aggregation target presence information
  (iv) Sending notification of aggregate presence information at every fixed time period (g) Aggregating Unit Of the presence information of the plurality of presentities of which an arbitrary watcher is notified, the aggregating unit 17 generates aggregate presence information that includes the presence information that has the same attribute value (corresponds to an aggregating step). The aggregating unit 17 executes aggregation in accordance with the aggregation rules. The following explains the timing of aggregation, the execution of aggregation, and the aggregation rules.

(Aggregation Timing)

The timing of aggregation is not particularly limited. In the present embodiment, aggregate presence information is generated in accordance with the following three timings.
  (i) When Subscribing: By executing aggregation when subscribing, a new buddy along with existing buddies that have presence information that has the same attribute value as that new buddy are aggregated, and it is therefore possible to relieve the watcher of the burden of classifying new buddies one by one.
  (ii) When Registering a New Presentity: By executing aggregation every time a new presentity is registered, the watcher of existing presence information can refer the presence information of an already registered buddy, as well as the presence information of a new presentity, as part of the aggregate presence information, without subscribing thereto. Accordingly, the watcher can be relieved of the burden of registering new presentities, which are registered one after the other, as buddies one by one.
  (iii) When a User Gives an Aggregation Instruction: By aggregating in accordance with an instruction wherein a user specifies, a watcher can easily classify a buddy based on classification criteria of ones own liking, and moreover the burden of classifying buddies one by one is relieved.

(Execution of Aggregation)

The execution of aggregation by the aggregating unit 17 specifically includes the steps of: i) generating a new aggregate presentity ID, ii) specifying the watcher of the aggregate presentity, iii) determining the aggregation attribute value, iv) specifying the aggregation target presentity IDs, v) updating the aggregation information table 13, vi) generating aggregate presence information, and vii) updating the watcher list 12. Namely, the aggregating unit 17 generates a new entry in the aggregation information table 13 and writes the subscriber ID, the aggregation attribute value, the aggregate presentity ID, and the new aggregation target presentity IDs. Furthermore, the aggregating unit 17 generates aggregate presence information, which includes all presence information of each aggregation target presentity ID that was written, and writes such to the watcher list 12. The subscribee ID associated with the written aggregate presence information is the aggregate presentity ID. Because the aggregate presence information is stored in the watcher list 12, the watcher can refer such at any time. Consequently, the watcher is relieved of the burden of storing and managing the aggregate presence information.

(Aggregation Rules)

FIG. 11 is an explanatory diagram that depicts one example of an aggregation rules described in XML format. The aggregating unit 17 executes aggregation, based on the aggregation rules, and is also capable of judging whether it is appropriate to execute aggregation. The aggregation rules may be generated by the aggregating unit 17 based on the aggregation attribute value, the minimum aggregation count, and the like specified in the aggregation request screen in FIG. 9, or may be stored in advance in the rule database 14. In addition, there may be one aggregation rule common to all clients C, or an aggregation rule for each of the clients C. In present example, an aggregation rule is generated for each of the client IDs. By judging whether it is appropriate to execute aggregation based on the aggregation rule, the watcher can judge whether aggregation is needed beforehand. Furthermore, the aggregation rule is not limited to the present example.

For example, consider a client "User1" that sets up aggregation so that it is automatically executed if the number of buddies that have presence information wherein the value of the attribute "product" is "DVDRecorder" reaches three. Accordingly, the aggregating unit 17 executes aggregation if the number of buddies that have presence information wherein the value of the attribute "product" is "DVDRecorder" reaches three. Meanwhile, if the number of buddies that have presence information wherein the value of the attribute "product" is "LCDTV" reaches five, then the client "User1" sets up an inquiry for whether it is appropriate to aggregate. The aggregating unit 17 transmits the inquiry to the watcher based on this setup; if it receives a response to the effect of "do not aggregate," then the execution of aggregation is suspended.

(h) Aggregation Permission Acquiring Unit

The aggregation permission acquiring unit 18 inquires with the presentity of the aggregation target presence information, i.e., with the aggregation target presentity, whether to permit aggregation in accordance with the aggregation permission rules. The aggregation permission rules may be generated by the aggregation permission acquiring unit 18 in accordance with the response to the inquiry made to the aggregation target presentity, or may be stored in advance in the rule database 14. The abovementioned inquiry is transmitted by the aggregation permission acquiring unit 18 to the aggregation target presentity prior to the execution of aggregation by the aggregating unit 17. There may be one aggregation permission rule common to all clients C, or an aggregation permission rule for each of the clients C.

FIG. 12 is an explanatory diagram that depicts one example of aggregation permission rules stored in the rule database 14. In this example, an aggregation permission rule is generated for each client ID that constitutes a presentity. For example, consider a client "Item1" that, when aggregating its own presence information wherein the value of the attribute "product" is "DVDRecorder", permits the aggregation of a client "User1", rejects the aggregation of other client "user9", and sets up an inquiry of whether to aggregate clients other than those.

By setting the aggregation permission rules, it is possible to prevent ones own presence information, along with the presence information of other presentities that will unknowingly have the same attribute, from being unfortunately provided, from the perspective of the aggregation target presentities, to a third party. Accordingly, it is possible to protect the privacy of the aggregation target presentities.

Furthermore, the content of the aggregation permission rules is not limited to the example discussed above; for example, it is conceivable that a client subject to the permission, rejection, or inquiry about aggregation can be specified by attribute instead of by client ID. In addition, aggregation permission and the like can be set by using time intervals, an attribute of ones own presence information, and the like.

(i) Notification Rule Setting Unit

The notification rule setting unit 19 accepts the specification of a notification condition of the aggregate presence information from a watcher of the aggregate presence information, generates a notification rule based on the specified notification condition, and stores the specified notification rule in the rule database 14. The presence notifying unit 16 sends notification of the aggregate presence information in accordance with the notification rule stored in the rule database 14.

Figure 13:
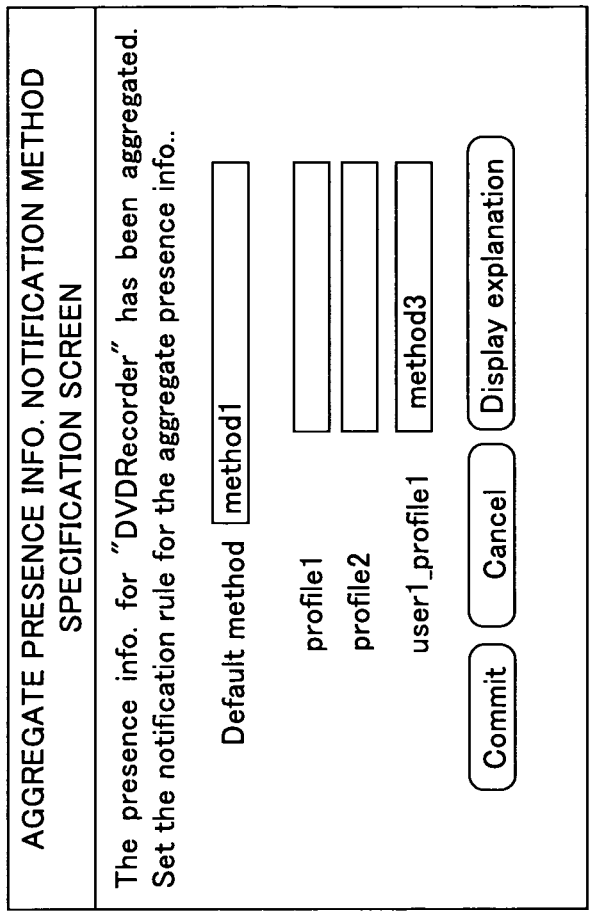
FIG. 13 is an explanatory diagram that depicts one example of a notification rule specification screen.

FIG. 13 is an explanatory diagram that depicts one example of a notification rule specification screen. For example, if the "aggregate button" is clicked in the aggregation request screen in FIG. 9, then the notification rule specification screen is displayed on the client side. In addition, a notification rule setting button is provided for the aggregate presence information in the menu screen in FIG. 6; if that button is clicked, the notification rule specification screen may be displayed. The notification rule specification screen accepts the specification of notification conditions of aggregate presence information from a watcher of the aggregate presence information. In this example, the communication service and the notification timing are set as the notification conditions. The accepted notification conditions are transmitted from the client C to the server S. The presence managing unit 15 of the server S passes the received notification conditions to the notification rule setting unit 19. The notification rule setting unit 19 generates notification rules based on the passed notification conditions, and registers such in the rule database 14.

FIG. 14 is an explanatory diagram that depicts one example of notification rules described in XML format. These notification rules define the communication service specified by the notification rule specification screen. For example, the communication service "profile1" is set as the predefined communication service for the presence system, and is described as "bandwidth is narrow, cost is high." The communication service "User1_profile1" is the communication service set up by the client, which is described as "bandwidth is broad, cost is medium".

FIG. 15 is an explanatory diagram that depicts another example of notification rules described in XML format. These notification rules define the notification timings specified by the notification rule specification screen. For example, the notification timing "method1" is notification timing predefined by presence system", which is defined as "every 30 minutes, send a notification that includes the presence information of the 10 aggregation targets for which the presence information was most recently updated". In addition, the notification timing "User1_method1" is "notification timing defined by client", which is defined as "if there is no update for one minute since the aggregate presence information was last modified, then send a notification that includes all aggregation target presence information".

If a notification timing is set so that a notification of aggregate presence information is sent at appropriate intervals, then it is possible to suppress frequent notifications of aggregate presence information. Consequently, the monitoring burden of the watchers, as well as the load on the network, can be relieved.

(j) Canceling Unit

The canceling unit 110 cancels aggregation. Conceivable judgment criteria for cancellation include: when an aggregation cancellation target has been specified, when aggregation conditions are no longer satisfied, and the like. The judgment criteria are defined by presence aggregation cancellation rules. Next, these two judgment criteria and a presence aggregation cancellation rule will be explained in greater detail.

(Cancellation by Specification)

A cancellation specification is accepted by the aggregation cancellation request screen, an example of which is illustrated in FIG. 10 as discussed above, and is transmitted from the client C to the server S. The canceling unit 110 acquires the aggregation attribute value, which was specified by the aggregation cancellation request screen in FIG. 10, and the watcher ID from the presence managing unit 15, and cancels the aggregation of the specified aggregate presence information. More specifically, the cancellation of aggregation is the deletion of the entry of specified aggregate presence information from the watcher list 12 and the aggregation information table 13.

More specifically, the canceling unit 110 searches the aggregation information table 13 using the specified aggregation attribute value and watcher ID as keys, and specifies the relevant entry. Furthermore, the canceling unit 110 obtains the aggregation information presentity IDs described in that entry, and specifies, from the watcher list 12, the entry that includes the subscribee ID that matches that aggregation information presentity IDs. The specified entry is deleted from the aggregation information table 13 and the watcher list 12. Thereby, the cancellation of aggregation is complete.

(Cancellation by a Condition No Longer Being Satisfied)

The canceling unit 110 cancels aggregation wherein an aggregation condition is no longer satisfied. The timing for judging whether the aggregation condition is satisfied is conceivably, for example, when updating the presence information. Specifically, the canceling unit 110 detects the case wherein the presence information of an aggregation target presentity is updated, and an attribute value thereof does not match the aggregation attribute value. Subsequently, the canceling unit 110 judges whether the number of remaining aggregation target presentities is greater than or equal to the minimum aggregation count. If the number of remaining aggregation target presentities falls below the minimum aggregation count, then the canceling unit 110 specifies the aggregate presentity IDs thereof and deletes the entries that include that ID from the aggregation information table 13 and the watcher list 12.

Furthermore, prior to canceling aggregation, the canceling unit 110 may transmit an inquiry to the watcher, and then execute or suspend the cancellation of aggregation in accordance with the response thereto. Thereby, the watcher can know that aggregation will be canceled beforehand.

(Presence Aggregation Cancellation Rule)

FIG. 16 is an explanatory diagram that depicts one example of presence aggregation cancellation rules described in XML format. The presence aggregation cancellation rules define the judgment criteria for the aggregation cancellation. These rules may be stored in advance in the rule database 14, or may be generated based on the cancellation conditions accepted from the client C. There may be one presence aggregation cancellation rule common to all clients C, or a presence aggregation cancellation rule for each of the clients C.

In the example in FIG. 16, the presence aggregation cancellation rules define the automatic cancellation of aggregation of a client "User1" if the minimum aggregation count of the presence information wherein the value of the attribute "product" is "DVDRecorder" is less than three. In addition, if the minimum aggregation count of presence information wherein the value of the attribute "product" is "LcdTv" is less than five, then it means that an inquiry will be sent to the user as to whether to cancel aggregation of the client "User1."

3. Client

Figure 2B:
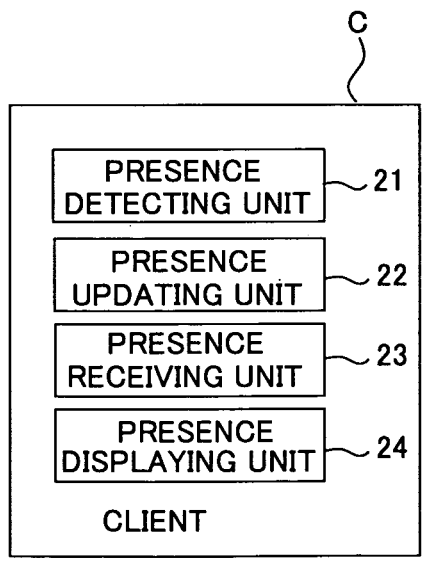
FIG. 2(b) is a block diagram that depicts the functions and constitution of the client C in FIG. 1.

Returning again to FIG. 2, the functions of a client C will now be explained. FIG. 2(*b*) is a block diagram that depicts the functions and constitution of the client C. The client C has the following constituent elements (a)-(d).

(a) presence detecting unit 21: The presence detecting unit 21 detects a change in the presence information of the client C or the operator thereof. For example, it detects: whether a specific application is running; the interval at which there is an input from the keyboard, the mouse, and the like; the input of presence information by the operator him or herself; and the like.

(b) presence updating unit 22: The presence updating unit 22 transmits presence information that was detected by the presence detecting unit 21 to the server S.

(c) presence receiving unit 23: The presence receiving unit 23 receives from the server S presence information of a buddy, aggregate presence information, and the like.

(d) presence displaying unit 24: If a screen is provided from the server S, the presence displaying unit 24 displays the provided menu screen, submenu screen, and the like (refer to the abovementioned FIG. 6 through FIG. 10, and FIG. 13). If the screen is drawn on the client C side, then a screen drawing is executed. In addition, the presence displaying unit 24 displays presence information and aggregate presence information in prescribed areas on the menu screen so that they can be visually discriminated. FIG. 6 is an example that depicts the display of presence information and aggregate presence information so that they can be discriminated. In this figure, aggregate presence information and unaggregated presence information are displayed in different fields. In addition, the aggregation attribute values of the aggregate presence information are displayed, and aggregation target presence information is displayed if an aggregation attribute value is clicked. FIG. 6 depicts an example wherein the aggregation attribute value "desktopPC" is clicked, and the aggregation target presence information thereof and the aggregation target presentity IDs (Item16 and Item23) are displayed.

The limited display area can be effectively utilized by collectively displaying aggregate presence information by, for example, its aggregation attribute value. In addition, hierarchically displaying presence information, of which a large quantity exists, leads to the relieving of the effort needed by the watcher to monitor the presence information.

Processes (1) Aggregation

The following cites examples to explain the aggregating process executed by the server S. Hereinbelow, examples are cited to explain the case wherein presence information is aggregated when subscribing, when registering a new user, and when a client requests aggregation. However, the timing of aggregation execution is not limited to these examples.

(1-1) Subscribing Aggregation Process

Figure 17:
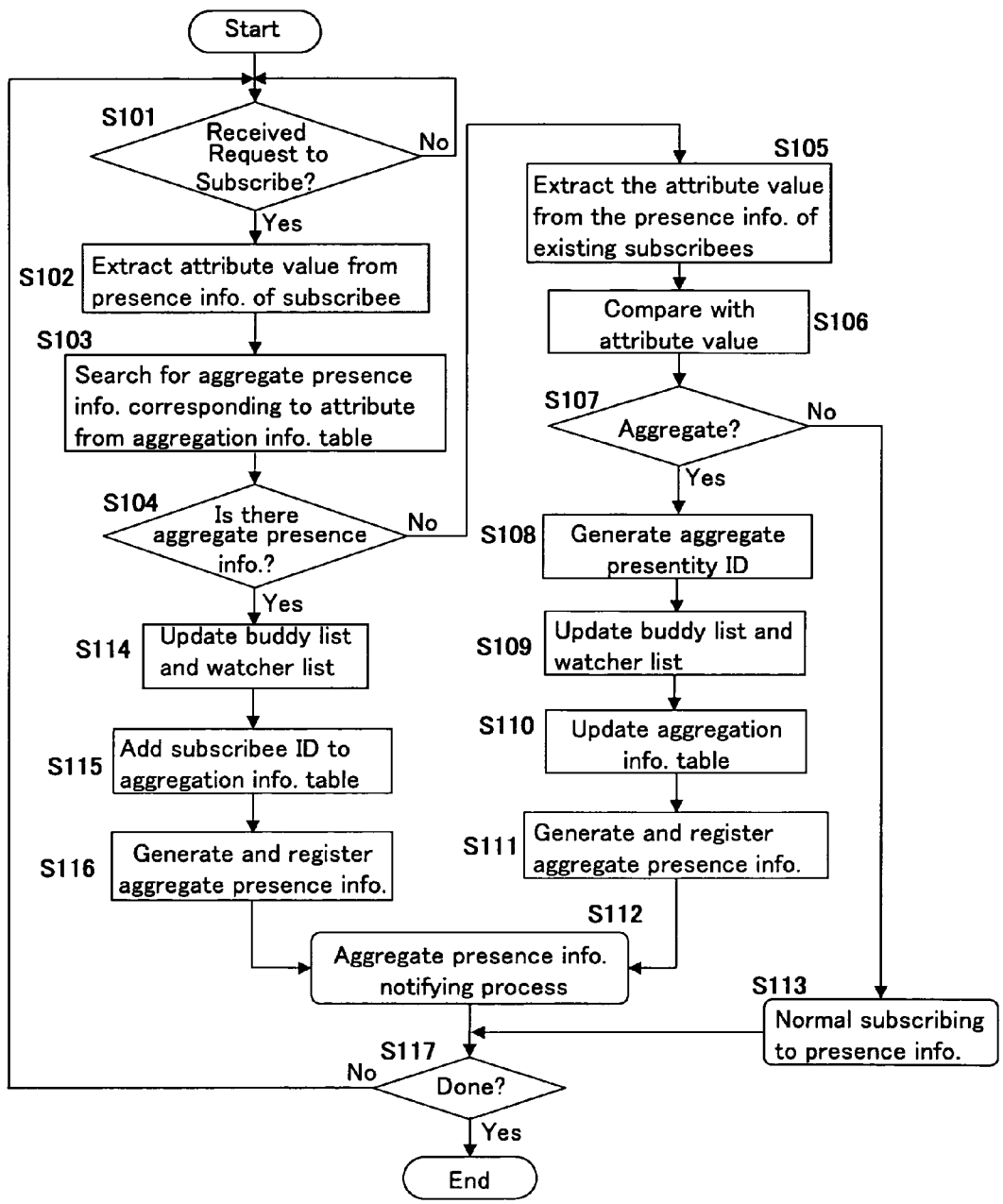
FIG. 17 is a flow chart that depicts one example of the flow of a subscribing aggregating process executed by the server S.

FIG. 17 is a flow chart that depicts one example of the flow of the subscribing aggregation process executed by the server S. This process starts when the server starts up. This process is largely divided into an aggregation completed judging process, an aggregation executing process, an aggregation deferring process, and an aggregation notifying process.

(Aggregation Completed Judging Process: S101-S104)

Every time presence information is newly subscribed to, the aggregation completed judging process judges whether aggregation is executed for the subscriber based on the attribute possessed by the subscribee.

STEP S101: The aggregating unit 17 stands by for an arbitrary client to make a request to subscribe via the presence managing unit 15. If subscribing occurs, the process transitions to step S102. Now, let us consider a case wherein a subscriber "User1" subscribes to a subscribee "Item10."

STEP S102: The aggregating unit 17 extracts one or more attribute values from the current presence information of the new subscribee. Specifically, the aggregating unit 17 extracts the subscribee ID "Item10" from the data received from the client. In addition, the aggregating unit 17 obtains the current presence information "<product>DVDRecorder</product>transport in progress" of the subscribee "Item10" from the "watcher table." Furthermore, the aggregating unit 17 extracts the attribute value "DVDRecorder" from the presence information that was obtained.

STEP S103: The aggregating unit 17 searches the aggregation information table 13 for the extracted attribute value "DVDRecorder."

STEP S104: If the extracted attribute value "DVDRecorder" is not in the aggregation information table 13, then the aggregating unit 17 transitions to step S105, wherein the aggregating unit 17 executes aggregation and sends a notification of aggregate presence information (S105-S111). Namely, if the attribute of the subscribee is unaggregated, then aggregation is executed.

Conversely, if the extracted attribute value "DVDRecorder" is in the aggregation information table 13, then the corresponding aggregate presentity ID "User1_DVDRecorder" is extracted, and the process then transitions to step S114, which is discussed later. Namely, if the attribute of the subscribee is aggregated, then the aggregation information table 13 is updated and a notification of aggregate presence information is sent to the subscriber.
(Aggregation Executing Process: S105-S112)

In the aggregation executing process, if there is already the stipulated number of subscribees that have the same attribute but that are not aggregated, then aggregation is executed and the subscriber is notified of the collective presence information of the aggregation target presentities.

STEP S105: If the newly subscribed presence information is not aggregated, then the aggregating unit 17 obtains the existing buddy IDs associated with the subscriber ID "User1" from the buddy list 11.

STEP S106: The aggregating unit 17 searches the watcher table, and acquires the attribute values included in the presence information of each of the acquired existing buddy IDs. Furthermore, the aggregating unit 17 sequentially compares the attribute values of the existing buddy IDs with the attribute value "DVDRecorder" of the new subscribee, and counts the number of existing buddy IDs that have an attribute value that matches the attribute value "DVDRecorder" of the new subscribee.

STEP S107: The aggregating unit 17 judges whether the number of existing buddy IDs that have an attribute value that matches the attribute value "DVDRecorder" of the new subscribee is greater than or equal to a stipulated number. If it is greater than or equal to the stipulated number, then the aggregating unit 17 judges that aggregation is to be performed, and the process transitions to step S108. If it is less than the stipulated number, then the aggregating unit 17 judges that aggregation is not to be performed, and the process transitions to step S113, which is discussed later.

STEP S108: The aggregating unit 17 generates a new aggregate presentity ID, e.g., "User1_DVDRecorder." In addition, the aggregating unit 17 determines that the aggregation target presentity IDs are the subscribee ID "Item10" and the existing buddy IDs that have an attribute value "DVDRecorder" identical to the subscribes "Item10."

STEP S109: The aggregating unit 17 passes to the presence managing unit 15 the request to register the subscriber ID and the watcher ID in the watcher list 12. This registration request includes the aggregate presentity ID "User1_DVDRecorder" as the subscribee ID, and the subscriber ID "User1" as the watcher ID. A new entry is added to the watcher list 12 as a result of this registration request. The subscribee ID "User1_DVDRecorder" and the watcher ID "User1" are respectively written in this entry.

In addition, the presence managing unit 15 adds the subscribee ID "Item10" to the buddy ID corresponding to the subscriber "User1" in the buddy list 11. In addition, the subscriber ID "User1" is added to the watcher ID corresponding to the subscribee ID "Item10" in the watcher list 12.

STEP S110: The aggregating unit 17 generates a new entry in the aggregation information table 13 and writes the subscriber ID, the aggregation attribute, the aggregate presentity ID, and the aggregation target presentity IDs. In this example, the subscriber ID "User1", the aggregation attribute "DVDRecorder", the aggregate presentity ID "User1_DVDRecorder", and the aggregation target presentity IDs "Item1", "Item2", "Item10" are written, respectively.

STEP S111: The aggregating unit 17 obtains the presence information corresponding to the aggregation target presentity IDs from the watcher list 12, and generates aggregate presence information that includes all presence information. The generated aggregate presence information is written to the watcher list 12 as the presence information of the aggregate presentity ID "User1_DVDRecorder."

STEP S112: If the presence information of the watcher list 12 is updated, then the presence notifying unit 16 transmits the updated presence information to the watcher thereof. Specifically, the presence notifying unit 16 transmits aggregate presence information to the watcher "User1" of the written aggregate presence information.
(Aggregation Deferring Process: STEP S113)

In the aggregation deferring process, if the number of subscribees that have the same attribute value has not reached the stipulated number although subscribees are not aggregated, then those subscribees are subscribed to in a normal manner without aggregating.

STEP S113: In the abovementioned step S107, aggregation is not executed if the number of existing buddy IDs that have an attribute value that matches the attribute value "DVDRecorder" of the new subscribee is less than the stipulated number. In that case, the aggregating unit 17 requests that the presence managing unit 15 performs the process corresponding to a normal subscribing. The presence managing unit 15 adds to and registers in the buddy list 11 the subscribee ID "Item10" as the buddy ID of the subscriber ID "User1." In addition, the presence managing unit 15 adds to and registers in the watcher list 12 the subscriber ID "User1" as the watcher ID of the subscribee "Item10." Thereafter, the presence notifying unit 16 notifies the watcher "User1" of the presence information of the subscribee "Item10."
(Aggregation Notifying Process: S114-S116, S112)

In the aggregation notifying process, if aggregation is executed based on the attribute possessed by the new subscribee, then the subscriber is notified of the presence information of other aggregation target presentities along with the presence information of that subscribee.

STEP S114: In step S104, if newly subscribed presence information is aggregated, then the process transitions to step S114. The aggregating unit 17 publishes the subscribing to the presence managing unit 15. The subscriber ID "User1" and the subscribee ID "Item10" are included in this subscribing.

In accordance with this subscribing, the presence managing unit 15 registers the subscribee ID "Item10" as the buddy ID of the subscriber ID "User1", and registers "User1" as the watcher ID of the subscribee ID "Item10".

STEP S115: The aggregating unit 17 adds to and registers the subscribee ID "Item 10" as the aggregation target presentity ID of the aggregate presentity ID "User1_DVDRecorder" that was extracted in step S104.

STEP S116: The aggregating unit 17 generates the aggregate presence information of the aggregate presentity "User1_DVDRecorder" and writes it to the watcher list 12. The aggregate presence information includes all presence information of the aggregation target presentity IDs corresponding to the aggregate presentity ID. Subsequently, the presence notifying unit 16 transmits the updated presence information, the aggregate presence information in this case, to the watcher thereof (S112).

STEP S117: The process in the abovementioned steps S101-S116 is performed repetitively until the power supply to the server is turned off.

Every time presence information is newly subscribed to, aggregation is executed as needed by the above process. From the perspective of the watcher, buddies corresponding to an attribute are aggregated just by subscribing, which relieves the burden on the watcher of the manual work of classifying the buddies.

Prior to the abovementioned step S108, the aggregation permission acquiring unit 18 may transmit an inquiry to the subscribee "Item10" as to whether it is all right to aggregate the presence information. In this case, the process from step S108 onward is performed in accordance with the response thereto.

(1-2) New Presentity Aggregation Process

Figure 18:
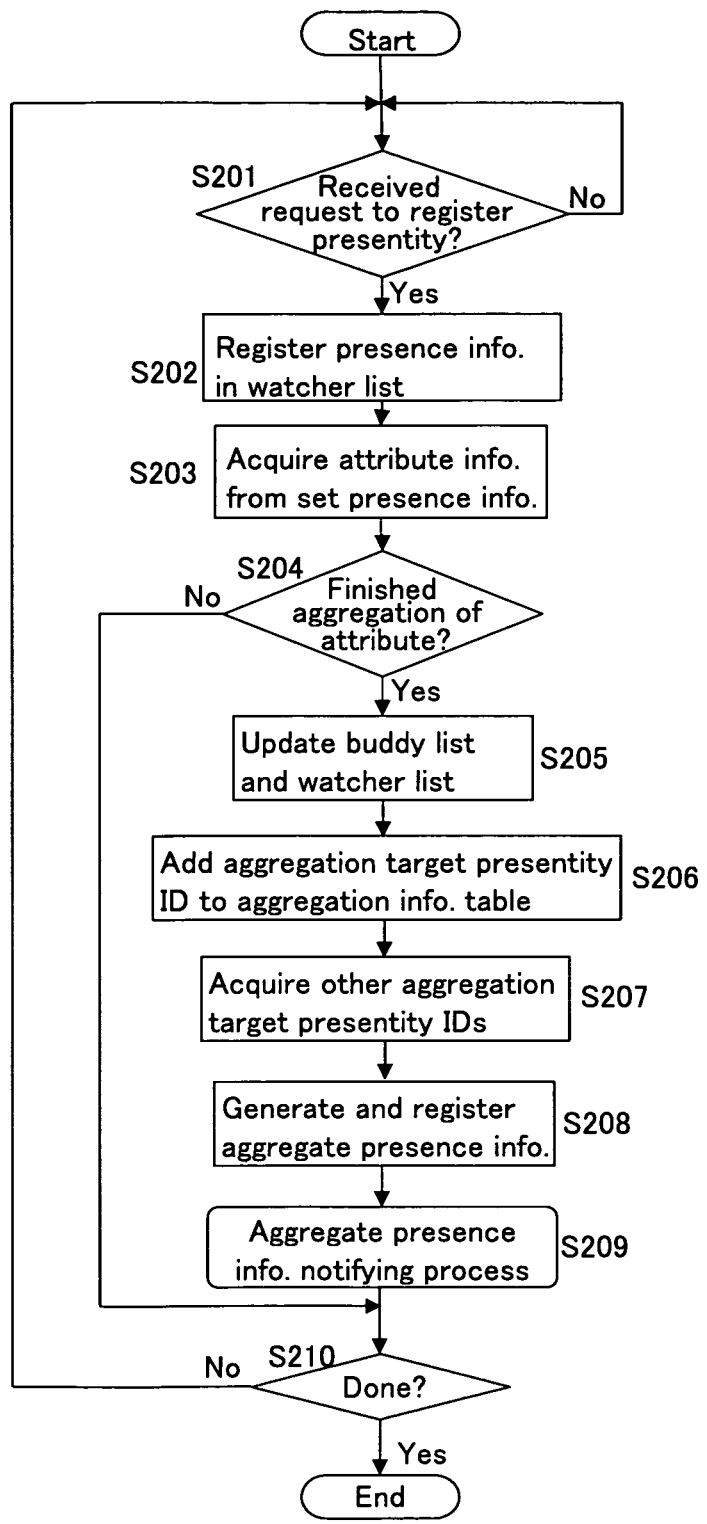
FIG. 18 is a flow chart that depicts one example of the flow of a new presentity aggregating process executed by the server S.

FIG. 18 is a flow chart that depicts one example of the flow of a new presentity aggregating process executed by the server S. This process is started by the startup of the server. This process is largely divided into the aggregation completed judging process and the aggregation notifying process.

(Aggregation Completed Judging Process: S201-S204)

Every time a new presentity is registered in the presence system, the aggregation completed judging process judges whether aggregation is being executed based on the attribute possessed by that presentity.

STEP S201: The aggregating unit 17 stands by for the request to register a new presentity from an arbitrary client via the presence managing unit 15. If a registration request is generated, the process transitions to step S202. Now, let us consider a case wherein the client of the administrator registers a new presentity ID "Item10," and its presence information "<product>DVDRecorder</product>transport in progress."

STEP S202: The presence managing unit 15 registers the new presentity ID "Item10" and its presence information in the watcher list 12.

STEP S203: The aggregating unit 17 extracts the attribute value, e.g., "DVDRecorder," from the presence information of the new presentity.

STEP S204: The aggregating unit 17 searches the aggregation information table 13 for the extracted attribute value "DVDRecorder" and judges whether aggregation is already being executed based on that attribute value.

If the aggregating unit 17 does not find the extracted attribute value "DVDRecorder" in the aggregation information table 13, then the process transitions to step S210, then returns to step S201 and repetitively performs the previously discussed process until the power supply to the server is turned off. Namely, if the attribute of a new presentity is unaggregated, then no processing is performed.

Conversely, if an aggregation attribute value that matches the extracted attribute value "DVDRecorder" is in the aggregation information table 13, then the aggregating unit 17 transitions to step S205, which is discussed later.

(Aggregation Notifying Process: S205-S209)

In the aggregation notifying process, nothing is done if aggregation is not being executed based on an attribute possessed by the new presentity. However, if aggregation is being executed, then the watcher of the aggregate presence information is notified of the presence information of that presentity along with the presence information of other aggregation target presentities.

STEP S205: The aggregating unit 17 publishes the subscribing to the presence managing unit 15. This subscribing includes the subscriber ID "User1" and the subscribee ID "Item10."

In accordance with this subscribing, the presence managing unit 15 registers the subscribee ID "Item10" as the buddy ID of the subscriber ID "User1", and registers "User1" as the watcher ID of the subscribee ID "Item10".

STEP S206: The aggregating unit 17 adds and registers the new presentity ID "Item10" as the aggregation target presentity ID corresponding to the aggregation attribute value "DVDRecorder."

STEP S207: The aggregating unit 17 obtains from the aggregation information table 13 the existing aggregation target presentity IDs associated with the aggregation attribute value "DVDRecorder." In addition, the aggregating unit 17 obtains from the aggregation information table 13 the aggregate presentity ID, e.g., "User1_DVDRecorder," corresponding to the aggregation attribute value.

STEP S208: The aggregating unit 17 generates aggregate presence information and registers such in the watcher list 12. The generated aggregate presence information includes the presence information of the existing aggregation target presentities, and the presence information of the newly registered presentity "Item10."

STEP S209: The presence notifying unit 16 transmits aggregate presence information to the watcher thereof in accordance with the updating of presence information in the watcher list 12.

STEP S210: The aggregating unit 17 repetitively performs the above process until the power supply to the server is turned off.

By performing the above process, even if a newly registered presentity is not registered as a buddy, the presence information of that presentity is aggregated and a notification thereof is sent.

Prior to the abovementioned step S205, the aggregation permission acquiring unit 18 may inquire with the new presentity whether it is all right to aggregate the presence information of the new presentity. In this case, the process of step S205 onwards is performed in accordance with the response thereto.

An example is cited here for "when registering a new presentity"; however, with a presence management system that has the presence information of a plurality of presentities, the above process can be executed even if new presence information is added to an existing presentity.

(1-3) Condition Specification Aggregating Process

Figure 19:
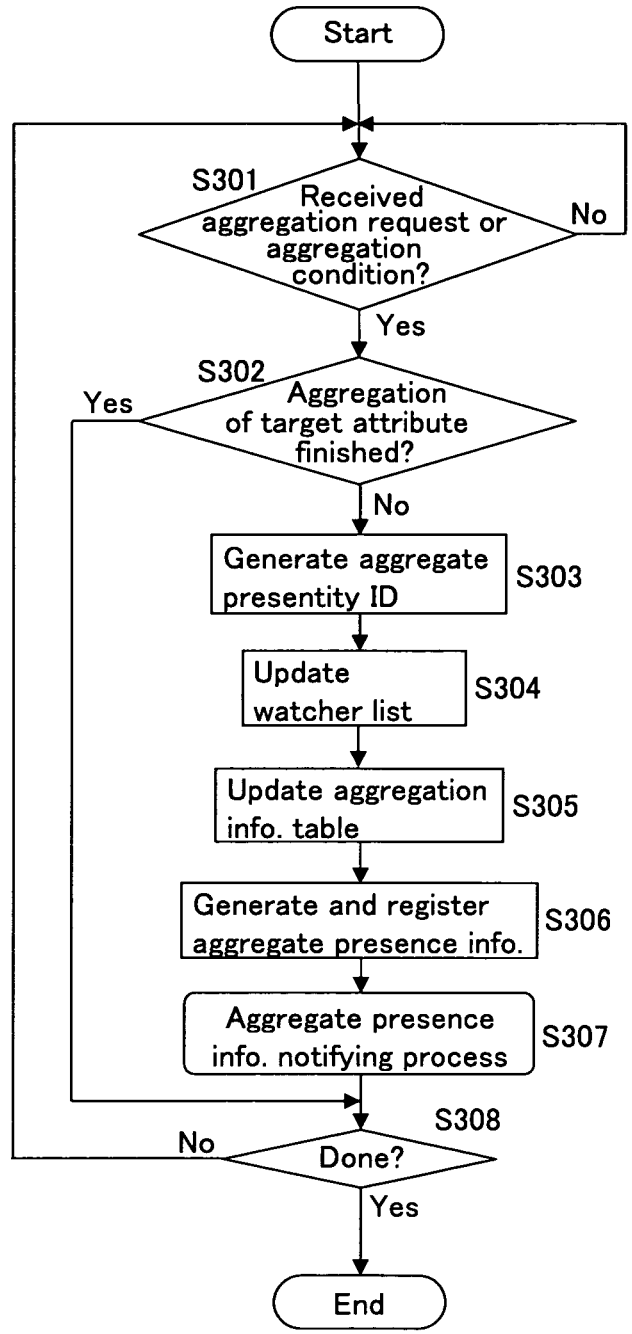
FIG. 19 is a flow chart that depicts one example of the flow of a condition specification aggregating process executed by the server S.

FIG. 19 is a flow chart that depicts one example of the flow of the conditions specification aggregating process executed by the server S. This process starts by the startup of the server. In this process, aggregation is executed in accordance with the aggregation conditions specified by a user. Here, let us consider a case wherein the client "User1" has specified the attribute value "DVDRecorder" and the minimum aggregation count "3" as the aggregation conditions by the aggregation request screen in FIG. 9.

STEP S301: The aggregating unit 17 stands by for the reception of an aggregation instruction, and transitions to step S302 if such is received.

STEP S302: The aggregating unit 17 extracts the aggregation attribute value, e.g., "DVDRecorder," included in the received aggregation instruction, and searches the aggregation information table 13 for that extracted aggregation attribute value "DVDRecorder." If the extracted aggregation attribute value "DVDRecorder" is not in the aggregation information table 13, then the aggregating unit 17 transitions to step S303. If the aggregation attribute value "DVDRecorder" is in the aggregation information table 13, then the process transitions to step S308, returns to step S301, and stands by for the reception of a new aggregation instruction as long as the power supply to the server is not turned off.

STEP S303: The aggregating unit 17 generates a new aggregate presentity ID, e.g., "User1_DVDRecorder," in accordance with the specified new aggregation attribute value "DVDRecorder." In addition, the aggregating unit 17 specifies the aggregation target presentity IDs. This specification is performed by searching the buddies of the aggregation requester "User1" for a buddies that have the attribute value "DVDRecorder."

STEP S304: The aggregating unit 17 passes to the presence managing unit 15 the request to register IDs in the watcher list 12. This registration request includes the subscribee ID "User1_DVDRecorder" and the watcher ID "User1." A new entry is added to the watcher list 12 by this registration request. In the present example, the subscribee ID "User1_DVDRecorder" and the watcher ID "User1" are written to the new entry, respectively.

STEP S305: The aggregating unit 17 generates a new entry in the "aggregation information table 13," and writes the subscriber ID, the aggregation attribute value, the aggregate presentity ID, and the aggregation target presentity IDs. In this example, the subscriber ID "User1", the aggregation attribute value "DVDRecorder", the aggregate presentity ID "User1_DVDRecorder", and the aggregation target presentity IDs "Item1", "Item2", "Item10" are written, respectively.

STEP S306: The aggregating unit 17 generates the aggregate presence information corresponding to the newly generated aggregate presentity ID, and registers such in the watcher list 12. The aggregate presence information includes the presence information of all aggregation target presentities.

STEP S307: If presence information of the watcher list 12 is updated, the presence notifying unit 16 transmits the aggregate presence information to the watcher thereof. In the present example, the presence information of the aggregate presentity ID "User1_DVDRecorder" is transmitted to the aggregation requester "User1."

STEP S308: The process in the above steps S301-S307 is performed repetitively until the power supply to the server is turned off.

The above process enables the execution of aggregation based on the aggregation conditions specified by the user. The ability of the user to classify buddies just by specifying an attribute value is advantageous because the user is relieved of the burden of manually classifying the buddies, and can specify the attribute value that it needs.

Furthermore, in the present embodiment, the aggregating unit 17 searches the aggregation information table 13 in order to judge whether the presence information, wherein the attribute value is the specified aggregation attribute value, is aggregated. Moreover, it is also possible to manage on the client side, in advance, the aggregation attribute values for which aggregation has finished. In so doing, if an aggregation attribute value for which aggregation has finished is specified, then it is possible to display an error screen and to prevent the wasteful transmission of aggregation instructions to the server.

(2) Aggregation Cancellation

Figure 20:
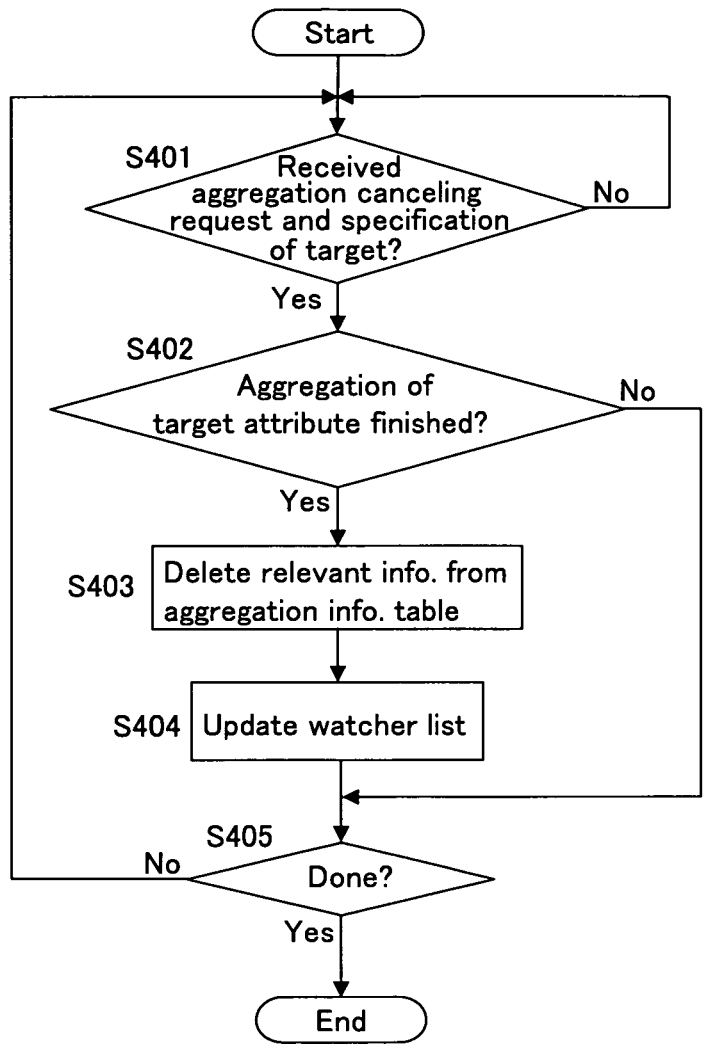
FIG. 20 is a flow chart that depicts one example of the flow of a condition specification aggregation canceling process executed by the server S.

FIG. 20 is a flow chart that depicts one example of the flow of a condition specification aggregation canceling process executed by the server S. This process is started by the startup of the server. In this process, the aggregation of an aggregation target specified by the user is canceled. Here, let us consider a case wherein a client "User1" has specified an attribute value "DVDRecorder" by the aggregation cancellation request screen in FIG. 10.

STEP S401: The canceling unit 110 stands by for the reception of an aggregation cancellation request, and transitions to step S402 if one is received.

STEP S402: The canceling unit 110 extracts the aggregation attribute value, e.g., "DVDRecorder," included in the aggregation cancellation request, and searches the aggregation information table 13 for that extracted aggregation attribute value. If the aggregation attribute value "DVDRecorder" is in the aggregation information table 13, then the process transitions to step S403. Otherwise, the process transitions to step S405, which is discussed later.

STEP S403: The canceling unit 110 specifies the aggregate presentity ID, e.g., "User1_DVDRecorder," of the entry wherein the subscriber ID matches the cancellation requester ID "User1" and the aggregation attribute value is "DVDRecorder." Subsequently, the canceling unit 110 deletes that entry from the aggregation information table 13.

STEP S404: The canceling unit 110 deletes from the watcher list 12 the entry wherein the watcher ID matches the cancellation requester ID "User1" and the subscribee ID matches the deleted aggregate presentity ID "User1_DVDRecorder."

STEP S405: The process of the abovementioned steps S401-S404 is performed repetitively until the power supply to the server is turned off.

The above process cancels the aggregation of aggregate presence information specified by a user.

Second Embodiment

Constitution

The presence system of the second embodiment has the same constitution as that of the first embodiment. However, the presence information includes a value related to "location" as an attribute. In addition, this presence system executes the aggregation, or cancellation thereof, of presence information when presence information changes. Consequently, the aggregating unit 17 and the canceling unit 110 have the following additional functions. To facilitate the explanation below, let's consider a case wherein the minimum aggregation count of the aggregate presence information is set to "3" as an aggregation condition.

If the presence information is updated, then the aggregating unit 17 judges whether to execute aggregation, and then executes aggregation according to the judgment result. The judgment of whether to execute aggregation is made based on whether the minimum aggregation count has been satisfied. Prior to aggregation execution, the aggregating unit 17 may transmit an inquiry to the client C that is the watcher of the aggregate presence information, which the aggregating unit 17 is about to generate.

In addition, if any aggregation target presence information is updated, then the aggregating unit 17 updates the aggregate presence information and writes such to the watcher list 12. Thereby, the watcher list 12 holds the latest values of the aggregate presence information, and it is therefore possible for a watcher of the aggregate presence information to refer the latest aggregate presence information at any time.

If the presence information is updated, the canceling unit 110 judges whether there is aggregate presence information for which the minimum aggregation count is no longer satisfied. Specifically, the canceling unit 110 searches the aggregation information table 13 based on the attribute value of the presence information before the update. If, as a result of the search, the number of aggregation target presentity IDs since the update of presence information is less than the minimum aggregation count, then the canceling unit 110 deletes the corresponding entry from the aggregation information table 13. Prior to deletion, the canceling unit 110 may transmit an inquiry to the watcher of the aggregate presence information.

Figure 21A:
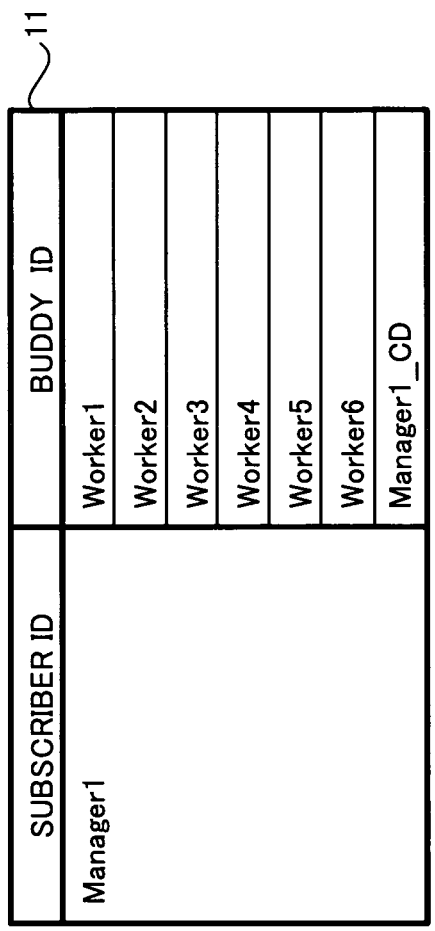
FIG. 21(a) is an explanatory diagram that depicts one example of a buddy list (before a change in the presence information) according to the second embodiment.

FIG. 21 and FIG. 22 are explanatory diagrams that depict one example of a buddy list 11, a watcher list 12, and an aggregation information table 13 according to the present embodiment. In the present example, the value of the attribute "location" of the client "Worker 4" changes from "E City F District" to "A City B Ward," and an aggregation is executed based on the attribute value "A City B Ward." FIG. 21 depicts the state before the change, and FIG. 22 depicts the state after the change. As a result of this change, the number of presentities that have the position "A City B Ward" changes from "2" to "3", and the aggregation condition based on the attribute value "A City B Ward" becomes satisfied (refer to the watcher list 12 in FIG. 21(*b*) and FIG. 22(*b*)). FIG. 22(*c*) is the aggregation information table 13 in a state wherein the entries have been generated for the aggregate presentity ID "Manager1_AB" having the aggregation attribute value "A City B Ward." Likewise, if the number of aggregate presentities for any entry no longer meets the minimum aggregation count as a result of the change in presence information, then that entry is deleted from the watcher list 12 and the aggregation information table 13.

(Presence Change Aggregation Process)

Figure 23:
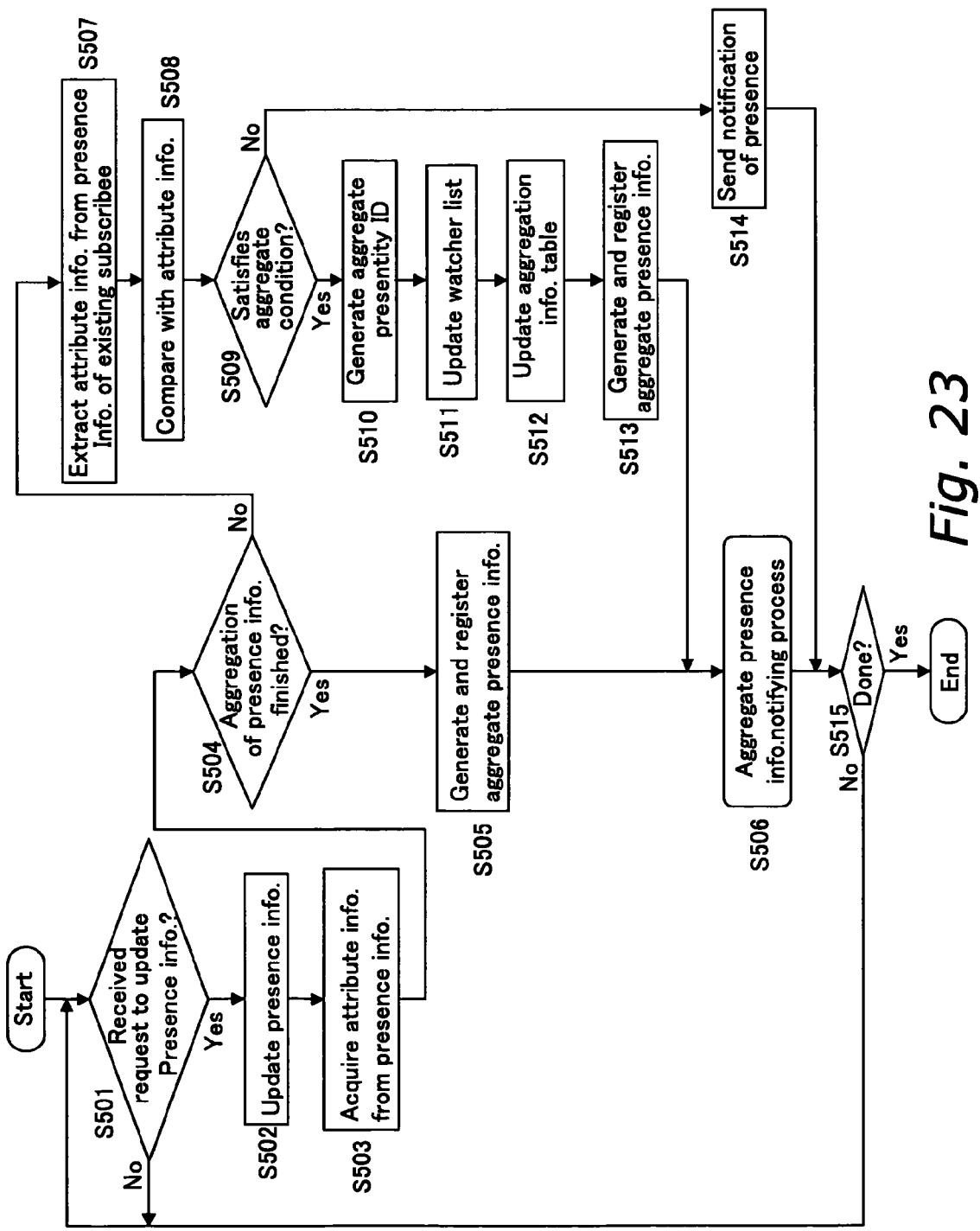
FIG. 23 is a flow chart that depicts one example of the flow of a presence change aggregation process executed by the server S.

FIG. 23 is a flow chart that depicts one example of the flow of the presence change aggregating process executed by the server S. In this process, aggregation is executed when presence information changes. This process is started by the startup of the server. To facilitate the explanation, let us now consider a case wherein new presence information "<position>A City B Ward</position>in transit" has been received from a client "Worker4" (refer to FIG. 22).

STEP S501: The presence managing unit 15 stands by for an update request to update presence information from an arbitrary client. In this example, if an update request is received from the client "Worker4," then the process transitions to step S502.

STEP S502: The presence managing unit 15 updates the watcher list 12. In the present example, the presence information corresponding to the subscribee ID "Worker4" in the watcher list 12 is updated to "<position>A City B Ward</position>in transit." In addition, the presence managing unit 15 passes the client ID "Worker4" along with the value of the new presence information to the aggregating unit 17.

STEP S503: The aggregating unit 17 extracts the attribute value from the new presence information "<position>A City B Ward</position>in transit." In the present example, it extracts the attribute value "A City B Ward."

STEP S504: The aggregating unit 17 searches the aggregation information table 13 for the extracted attribute value "A City B Ward." If the extracted attribute value "A City B Ward" is not in the aggregation information table 13, then the aggregating unit 17 transitions to step S507, which is discussed later, and executes aggregation (S507-S513). Namely, new aggregate presence information is generated in accordance with the aggregation condition, which was newly satisfied by the change in the presence information. Conversely, if the extracted attribute value "A City B Ward" is in the aggregation information table 13, then the aggregating unit 17 extracts the corresponding aggregate presentity ID, e.g., "Manager1_AB," and the process then transitions to step S505. Namely, if aggregation is executed based on the attribute value "A City B Ward," then the aggregating unit 17 extracts the aggregate presentity ID and then transitions to step S505.

STEP S505: The aggregating unit 17 updates the watcher list 12 based on the extracted aggregate presentity ID, e.g., "Manager1_AB." Specifically, the aggregating unit 17 obtains the aggregation target presentity IDs of the aggregate presentity ID "Manager1_AB." Furthermore, the aggregating unit 17 obtains from the watcher list 12 the presence information of the aggregation target presentity. The aggregating unit 17 generates aggregate presence information, which includes the presence information that was obtained, and writes such to the watcher list 12. Thereby, the aggregate presence information is updated.

STEP S506: The presence notifying unit 16 transmits the aggregate presence information, which was written to the watcher list 12, to the watcher thereof.

STEPS S507-S509: If it is judged that the attribute value "A City B Ward" of the updated presence information is not in the aggregation information table 13 (step S504), then the aggregating unit 17 refers the watcher list 12 and judges whether, among the presence information associated with the identical watcher ID, the number of presentities wherein the presence information has the attribute value "A City B Ward" is three or greater. If it is judged to be three or greater, i.e., if it is judged that the aggregation condition is satisfied, then the process transitions to step S510. If the aggregation condition is not satisfied, then the process transitions to step S514, which is discussed later, and a normal notification of presence information is sent.

STEP S510: The aggregating unit 17 generates a new aggregate presentity ID, e.g., "Manager1_AB." In addition, the aggregating unit 17 refers the watcher list 12 and determines the aggregation target presentity IDs and the subscriber ID. Specifically, the aggregating unit 17 sets the subscriber ID as the watcher ID, e.g., "Manager1," associated with the subscribee ID "Worker4." In addition, the aggregating unit 17 sets the aggregation target presentity IDs as the subscribee IDs associated with the presence information, among the presence information associated with the watcher ID "Manager1," that has an attribute value "A City B Ward."

STEP S511: The aggregating unit 17 adds the new entry to the watcher list 12. In the new entry, the generated aggregate presentity ID "Manager1_AB" is written as the subscribee ID, and the subscriber ID "Manager 1" of the aggregate presence information is written as the watcher ID.

STEP S512: The aggregating unit 17 generates a new entry in the aggregation information table 13, and writes the subscriber ID, the aggregate presentity ID, and the aggregation target presentity IDs determined by step S510. In addition, the attribute value of the updated presence information, "A City B Ward" in the present example, is written as the aggregation attribute value.

STEP S513: The aggregating unit 17 obtains from the watcher list 12 the presence information corresponding to the generated aggregation target presentity IDs, and generates aggregate presence information that includes all presence information. The generated aggregate presence information is written to the watcher list 12 as the presence information of the aggregate presentity ID "Manager1_AB."

STEP S506: If presence information in the watcher list 12 is updated, the presence notifying unit 16 transmits the updated presence information to the watcher thereof. Specifically, the presence notifying unit 16 transmits the generated aggregate presence information to the watcher "Manager1" of the updated presence information, which is the written aggregate presence information in this case.

STEP S514: The presence notifying unit 16 sends notification of the presence information updated by the client "Worker4" to the watcher "Manager1" of that presence information.

STEP S515: The process in the above steps S501-S514 is performed repetitively until the power supply to the server is turned off.

By performing the above process, new aggregate presence information, for which the aggregation condition has become satisfied, is generated and a notification thereof is sent in the event that the presence information is updated. Accordingly, even if the presence information changes, the watcher is relieved of the burden of having to reaggregate the presence information of each presentity one by one, in accordance with the change. In addition, there is an advantage in that the watcher can monitor that change in units of attributes.

Prior to the abovementioned step S510, an inquiry as to whether it is appropriate to aggregate may be sent to the watcher of the aggregate presence information that the aggregating unit 17 is about to newly generate, and the process from step S510 onward may be performed in accordance with the response thereto. There is also the advantage in that the watcher can know whether aggregation is about to be executed in advance.

(Presence Change Aggregation Canceling Process)

Figure 24:
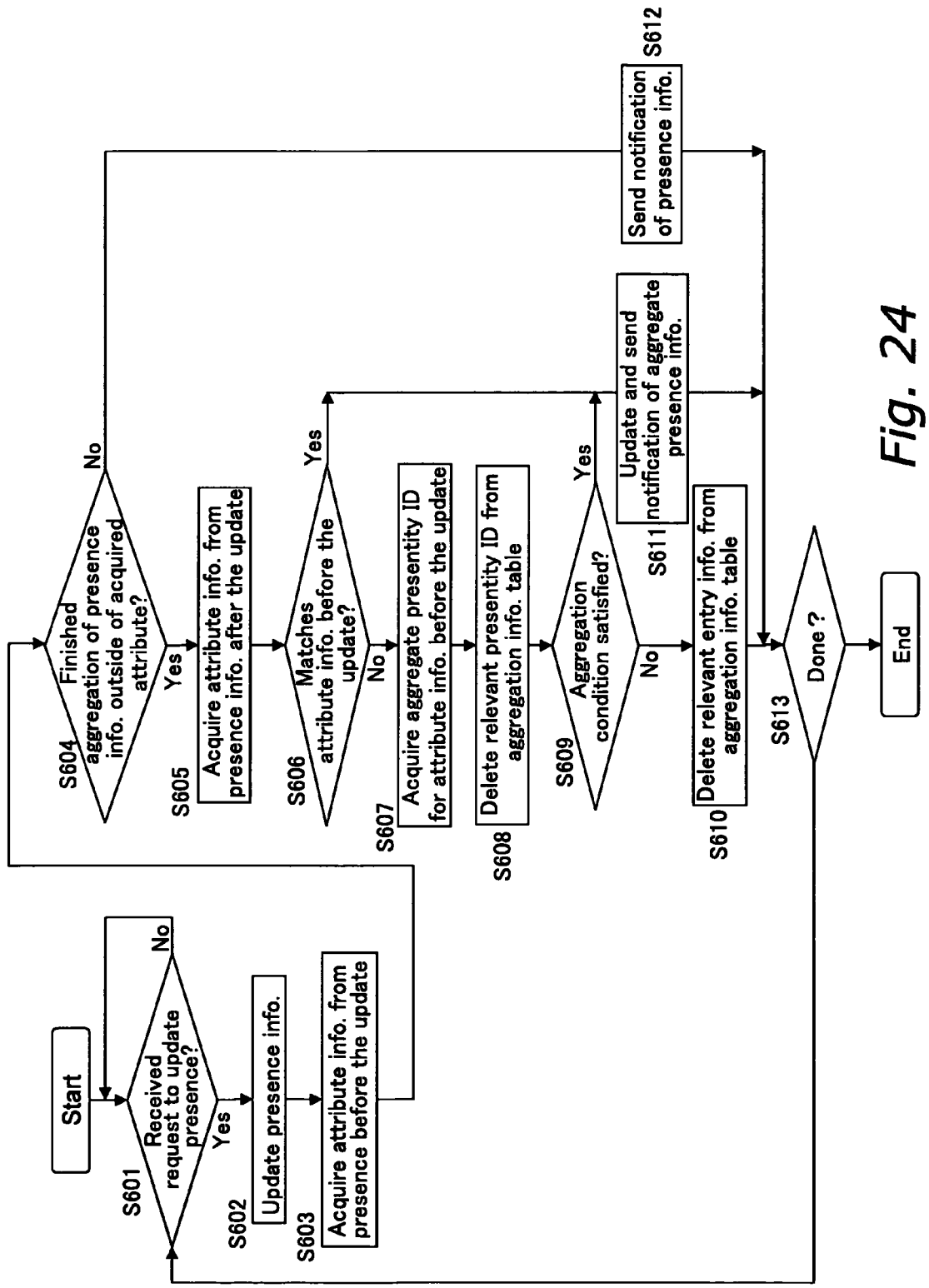
FIG. 24 is a flow chart that depicts one example of the flow of a presence change aggregation canceling process executed by the server S.

FIG. 24 is a flow chart that depicts one example of the flow of the presence change aggregation canceling process executed by the server S. This process cancels aggregation when presence information has changed. This process is started by the startup of the server. This process cancels aggregation by the change in presence information. Here, let us consider a case wherein the presence information of a client "Worker4" has changed from "<position>A City B Ward</position>in transit" (refer to FIG. 22(b)) to "<position>C City D District</position>in transit" (refer to FIG. 21(b)).

STEP S601: The presence managing unit 15 stands by for a request to update presence information from an arbitrary client. In the present example, if a request to update is received from the client "Worker4," then the process transitions to step S602.

STEP S602: The presence managing unit 15 updates the watcher list 12. In the present example, the presence information corresponding to the subscribee ID "Worker4" in the watcher list 12 is updated to "<position>C City D District</position>in transit." In addition, the presence managing unit 15 passes to the canceling unit 110 the client ID "Worker4", the presence information value "<position>A City B Ward</position>in transit" before updating, and the presence information value "<position>C City D District</position>in transit" after updating.

STEP S603: The canceling unit 110 extracts the attribute value from the presence information "<position>A City B Ward</position>in transit" before the update. In the present example, the canceling unit 110 extracts the attribute value "A City B Ward."

STEP S604: The canceling unit 110 searches the aggregation information table 13 for the extracted attribute value "A City B Ward." If the extracted attribute value "A City B Ward" is not in the aggregation information table 13, then the canceling unit 110 transitions to step S612, which is discussed later. Namely, because the old presence information is not the aggregation target presence information, there is no need to cancel aggregation, and the process consequently transitions to step S612. Conversely, if the extracted attribute value "A City B Ward" is in the aggregation information table 13, then the process transitions to step S605.

STEP S605: The canceling unit 110 extracts the attribute value from the presence information "<position>C City D District</position>in transit" after the update. In the present example, the canceling unit 110 extracts the attribute value "C City D District."

STEP S606: The canceling unit 110 judges whether the attribute value of the presence information before the update matches the attribute value of the presence information after the update. Namely, the canceling unit 110 judges whether the attribute value has been changed by the updating of the presence information. If they match, then the process transitions to step S611. If they do not match, then the process transitions to step S607.

STEP S607: The canceling unit 110 extracts the aggregate presentity ID, e.g., "Manager1_AB," corresponding to the aggregation target presentity ID "Worker4," and then transitions to step S608. Namely, if aggregation is being executed based on the attribute value "A City B Ward" of the presence information before the update, then that aggregate presentity ID is extracted, and the process transitions to step S608.

STEP S608: The canceling unit 110 refers the aggregation information table 13 and deletes "Worker4" from the aggregation target presentity IDs associated with the aggregate presentity ID "Manager1_AB." Namely, the client "Worker4" is removed from the aggregation target presentities that have the old attribute value "A City B Ward."

STEP S609: The canceling unit 110 judges whether the number of aggregation target presentity IDs that have the aggregation attribute value "A City B Ward" satisfies the minimum aggregation count. If satisfied, then the process transitions to step S611 mentioned below. If not satisfied, then the process transitions to step S610.

STEP S610: The canceling unit 110 deletes the entry that includes the aggregation attribute value "A City B Ward" from the aggregation information table 13.

STEP S611: If the number of aggregation target presentity IDs associated with the old aggregation attribute value "A City B Ward," which was possessed by the presence information before the update, is greater than or equal to the minimum aggregation count, then the aggregating unit 17 updates the aggregate presence information of those aggregation target presentity IDs. This is because the aggregate presence information must be updated because the number of aggregation target presentities has decreased. The presence notifying unit 16 sends a notification of the updated aggregate presence information to the watcher thereof.

STEP S612: The presence notifying unit 16 sends notification of the updated presence information of the client "Worker4" to the watcher "Manager1" thereof.

STEP S613: The process in the above steps S601-S612 is performed repetitively until the power supply to the server is turned off.

By performing the above process, aggregation is automatically canceled if the minimum aggregation count is no longer satisfied by the updating of the presence information, which makes it possible to relieve the burden on the watcher of performing cancellation.

Prior to step S610, an inquiry as to whether it is appropriate to cancel aggregation is sent to the watcher of the aggregate presence information, and the entry in the aggregation information table 13 may be deleted in accordance with the response thereto. The watcher can verify in advance whether aggregation will be canceled.

Effects of the Invention

According to the present invention, the presence information of a plurality of presentities is aggregated by attribute, and a merged notification thereof is sent, which makes it possible for a watcher to receive a presence information update notification by presence information attribute. Consequently, the burden on the watcher to classify the received presence information is relieved.

In addition, because newly registered presence information is automatically added to the aggregation target, the watcher is not required to subscribe to the presence information of all presentities one by one, which relieves the subscribing burden on the watcher.

Furthermore, the presence managing apparatus holds the latest values not only of the presence information that has become subject to aggregation, but also of the aggregated presence information. Consequently, even if the watcher does not save aggregated presence information, the watcher can always refer aggregated presence information.

The present invention can be adapted to any system that generates presence information of people and objects, such as distribution systems, inventory management systems, sensor systems that use ad hoc networks, and the like, and can also be adapted to the society of ubiquitous computing.

Other Embodiments

The scope of the present invention includes a computer program that causes a computer to execute the method discussed above, and a computer readable storage medium whereon that program is recorded. Here, examples of computer readable storage media include a flexible disk, a hard disk, a CD-ROM, an MO, a DVD, a DVD-ROM, DVD-RAM, a BD (Blu-ray Disc), and semiconductor memory.

The abovementioned computer program is not limited to one recorded on the abovementioned storage media, and may be one that is transmitted via, for example, a telecommunications line, a wired communication line, or a network, as represented by the Internet.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claim is:

1. A presence managing method executed by a presence managing apparatus comprising:
receiving a plurality of presence information sets, each of which includes an attribute value, from a plurality of provider clients;
storing each set of the plurality of presence information sets in association with a provider client among the plurality of the provider clients from which the presence information sets were received;
receiving, from a notification recipient client, a reception acquirement of the presence information set which is associated with at least one specified provider client and designates at least one presentity;
aggregating a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and
notifying the notification recipient client of the presence information set aggregated, wherein
the notification recipient accepts a registration of a new association of the provider client of the presence information, and the notification recipient client of the presence information thereof, and further stores the accepted association in the notification recipient management table;
the aggregating comprises:
extracting the attribute value included in the presence information of the provider client in the new association;
searching the notification recipient management table for an existing provider client, which is an existing provider client associated with the notification recipient client in the new association and wherein the extracted attribute value is included in the presence information thereof; and
generating aggregate presence information, which includes presence information of the searched existing provider client, and presence information of the new provider client; and
notifying the new notification recipient client of the aggregate presence information.

2. The presence managing method according to claim 1, wherein
the aggregating step comprises the substeps of:
accepting the specification of an aggregation condition, including an attribute value, from an arbitrary client;
specifying the provider client of presence information, from among presence information wherein the specified client in the notification recipient management table is the notification recipient, that has the specified attribute value; and
generating aggregate presence information that includes presence information of the specified provider client; and
the notifying step sends notification of the generated aggregate presence information to the specified client of the aggregation condition.

3. The presence managing method according to claim 1, wherein
a managing step accepts an update of presence information from an arbitrary client;
the aggregating step comprises the substeps of:
specifying the provider client of presence information that has an attribute value identical to the updated presence information;
specifying a notification recipient client associated with the specified provider client in the notification recipient management table; and
generating aggregate presence information, which includes presence information of the specified provider client, and the updated presence information; and
the aggregation notifying step sends notification of aggregate presence information generated by the aggregating step to the notification recipient client specified by the aggregating step.

4. The presence managing method according to claim 1, wherein
the aggregating step stores an aggregation information table that associates:
the identical attribute value;
the provider client of aggregation target presence information, which is presence information that has the identical attribute value;
an identifier of aggregate presence information generated based on the aggregation target presence information; and
the notification recipient client of the aggregate presence information; and a managing step associates and manages aggregate presence information generated by the aggregating step; and the identifier of the aggregate presence information.

5. The presence managing method according to claim 4, further comprising the step of:
a canceling step that comprises the substeps of:
accepting the specification of any attribute value stored in the aggregation information table from an arbitrary client; and
deleting from the aggregation information table the entry of the aggregate presence information, from among the aggregate presence information wherein the client is the notification recipient client, that has the specified attribute value.

6. The presence managing method according to claim 1, wherein the aggregating step comprises the substeps of:
updating the aggregation information table if an attribute value of arbitrary presence information managed by the managing step changes;
judging whether the number of provider clients of presence information, which has an attribute value identical to the attribute value before the change in the presence information, has fallen below a prescribed value; and
deleting the entry associated with the attribute value in the aggregation information table if it is judged that the number of the provider clients has fallen below the prescribed value.

7. The presence managing method according to claim 1, further comprising the step of an aggregation permission acquiring step that transmits an inquiry regarding the appropriateness of aggregation to the provider client of presence information that has the identical attribute value prior to the generation of the aggregate presence information, and acquires the response to that inquiry, and
the aggregating step generates aggregate presence information in accordance with the response acquired in the aggregation permission acquiring step.

8. The presence managing method according to claim 1, further comprising the step of an aggregation permission acquiring step that transmits an inquiry concerning whether it is appropriate to aggregate to the notification recipient client of the aggregate presence information prior to the generation of the aggregate presence information, and acquires the response to that inquiry, and
the aggregating step generates aggregate presence information in accordance with the response acquired in the aggregation permission acquiring step.

9. The presence managing method according to claim 1, further comprising the step of a notification rule storing step that stores a notification rule, which defines a notification condition of aggregate presence information, and
the aggregating step judges whether to generate aggregate presence information based on the notification rule.

10. The presence managing method according to claim 1, further comprising the step of:
a notification rule storing step that stores the notification rule, which defines the notification condition of aggregate presence information;
wherein, the aggregating step judges whether to generate aggregate presence information based on the notification rule; and
the notifying step judges whether to transmit the aggregate presence information based on the notification rule.

11. The presence managing method according to claim 1, further comprising the step of a notification rule storing step that stores the notification rule that defines a notification condition of aggregate presence information, and the aggregation notifying step judges whether to transmit the aggregate presence information based on the notification rule.

12. A presence managing apparatus connected to a plurality of clients, comprising:
a processor for executing instructions;
a first receiving instruction for receiving a plurality of presence information sets, each of which includes an attribute value, from a plurality of provider clients;
a storing instruction for storing each set of the plurality of presence information sets in association with a provider client among the plurality of the provider clients from which the presence information sets were received;
a second receiving instruction for receiving, from a notification recipient client, a reception acquirement of the presence information set which is associated with at least one specified provider client and designates at least one presentity;
an aggregating instruction for aggregating a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and
a notifying instruction for notifying the notification recipient client of the presence information set aggregated, wherein
the notification recipient accepts a registration of a new association of the provider client of the presence information, and the notification recipient client of the presence information thereof, and further stores the accepted association in the notification recipient management table;
the aggregating comprises:
extracting the attribute value included in the presence information of the provider client in the new association;
searching the notification recipient management table for an existing provider client, which is an existing provider client associated with the notification recipient client in the new association and wherein the extracted attribute value is included in the presence information thereof; and
generating aggregate presence information, which includes presence information of the searched existing provider client, and presence information of the new provider client; and
notifying the new notification recipient client of the aggregate presence information.

13. A presence managing program stored in a non-transitory computer readable medium that is executed by a computer connected to a plurality of clients, the program causing the computer to function as:
a first receiver that receives a plurality of presence information sets, each of which includes an attribute value, from a plurality of provider clients;
a storage that stores each set of the plurality of presence information sets in association with a provider client among the plurality of the provider clients from which the presence information sets were received;
a second receiver that receives, from a notification recipient client, a reception acquirement of the presence information set which is associated with at least one specified provider client and designates at least one presentity;
an aggregator that aggregates a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and a notifier that notifies the notification recipient client of the presence information set aggregated, wherein the notification recipient accepts a registration of a new association of the provider client of the presence information, and the notification recipient client of the presence information thereof, and further stores the accepted association in the notification recipient management table;

the aggregating comprises:

extracting the attribute value included in the presence information of the provider client in the new association;

searching the notification recipient management table for an existing provider client, which is an existing provider client associated with the notification recipient client in the new association and wherein the extracted attribute value is included in the presence information thereof; and generating aggregate presence information, which includes presence information of the searched existing provider client, and presence information of the new provider client; and notifying the new notification recipient client of the aggregate presence information.

14. A computer readable memory in which a presence managing program is recorded that causes a computer to function as a presence managing apparatus connected to a plurality of clients, the program causing the computer to function as:

a first receiver that receives a plurality of presence information sets, each of which includes an attribute value, from a plurality of provider clients;

a storage that stores each set of the plurality of presence information sets in association with a provider client among the plurality of the provider clients from which the presence information sets were received;

a second receiver that receives, from a notification recipient client, a reception acquirement of the presence information set which is associated with at least one specified provider client and designates at least one presentity;

an aggregator that aggregates a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and a notifier that notifies the notification recipient client of the presence information set aggregated, wherein the notification recipient accepts a registration of a new association of the provider client of the presence information, and the notification recipient client of the presence information thereof, and further stores the accepted association in the notification recipient management table;

the aggregating comprises:

extracting the attribute value included in the presence information of the provider client in the new association;

searching the notification recipient management table for an existing provider client, which is an existing provider client associated with the notification recipient client in the new association and wherein the extracted attribute value is included in the presence information thereof; and generating aggregate presence information, which includes presence information of the searched existing provider client, and presence information of the new provider client; and notifying the new notification recipient client of the aggregate presence information.

15. A presence referring apparatus connected to a presence managing apparatus that manages and distributes presence information of a plurality of presence providing apparatuses, comprising:

a processor for executing instructions;

a first receiving instruction for receiving a plurality of presence information sets, each of which includes an attribute value, from a plurality of provider clients;

a storing instruction for storing each set of the plurality of presence information sets in association with a provider client among the plurality of the provider clients from which the presence information sets were received;

a second receiving instruction for receiving, from a notification recipient client, a reception acquirement of the presence information set which is associated with at least one specified provider client and designates at least one presentity;

an aggregating instruction for aggregating a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and a notifying instruction for notifying the notification recipient client of the presence information set aggregated, wherein the notification recipient accepts a registration of a new association of the provider client of the presence information, and the notification recipient client of the presence information thereof, and further stores the accepted association in the notification recipient management table;

the aggregating comprises:

extracting the attribute value included in the presence information of the provider client in the new association;

searching the notification recipient management table for an existing provider client, which is an existing provider client associated with the notification recipient client in the new association and wherein the extracted attribute value is included in the presence information thereof; and generating aggregate presence information, which includes presence information of the searched existing provider client, and presence information of the new provider client; and notifying the new notification recipient client of the aggregate presence information.

16. A presence referring program stored in a non-transitory computer readable medium and executed by a computer connected to a presence managing apparatus that manages and distributes presence information of a plurality of presence providing apparatuses, the program causing the computer to function as:

a first receiver that receives a plurality of presence information sets, each of which includes an attribute value, from a plurality of provider clients;

a storage that stores each set of the plurality of presence information sets in association with a provider client among the plurality of the provider clients from which the presence information sets were received;

a second receiver that receives, from a notification recipient client, a reception acquirement of the presence information set which is associated with at least one specified provider client and designates at least one presentity;

an aggregator that aggregates a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and a notifier that notifies the notification recipient client of the presence information set aggregated, wherein the notification recipient accepts a registration of a new association of the provider client of the presence information, and the notification recipient client of the presence information thereof, and further stores the accepted association in the notification recipient management table;

the aggregating comprises:

extracting the attribute value included in the presence information of the provider client in the new association;

searching the notification recipient management table for an existing provider client, which is an existing provider client associated with the notification recipient client in the new association and wherein the extracted attribute value is included in the presence information thereof; and generating aggregate presence information, which includes presence information of the searched existing provider client, and presence information of the new provider client; and notifying the new notification recipient client of the aggregate presence information.

17. A non-transitory computer readable recording medium whereon is recorded a presence referring program executed by a computer connected to a presence managing apparatus that manages and distributes presence information of a plurality of presence providing apparatuses, the program causing the computer to function as:

a first receiver that receives a plurality of presence information sets, each of which includes an attribute value, from a plurality of provider clients;

a storage that stores each set of the plurality of presence information sets in association with a provider client among the plurality of the provider clients from which the presence information sets were received;

a second receiver that receives, from a notification recipient client, a reception acquirement of the presence information set which is associated with at least one specified provider client and designates at least one presentity;

an aggregator that aggregates a presence information set that includes the presence information sets having a same attribute value and being stored in association with the specified provider client and with one or more provider clients other than the specified provider client when receiving the reception acquirement of the presence information set, a presentity other than the designated presentity having the same attribute information as the designated presentity; and a notifier that notifies the notification recipient client of the presence information set aggregated, wherein the notification recipient accepts a registration of a new association of the provider client of the presence information, and the notification recipient client of the presence information thereof, and further stores the accepted association in the notification recipient management table;

the aggregating comprises:

extracting the attribute value included in the presence information of the provider client in the new association;

searching the notification recipient management table for an existing provider client, which is an existing provider client associated with the notification recipient client in the new association and wherein the extracted attribute value is included in the presence information thereof; and generating aggregate presence information, which includes presence information of the searched existing provider client, and presence information of the new provider client; and notifying the new notification recipient client of the aggregate presence information.

18. A presence managing method executed by a computer, executed process comprising:

storing a buddy identification and a subscriber identification to a notification recipient management table associating the buddy identification and the subscriber identification, the buddy identification specifying a client providing presence information, and the subscriber identification specifying a client notified of the presence information;

receiving the buddy identification and the presence information including an attribute value;

searching the subscriber identification based on the received buddy identification from the notification recipient management table;

generating aggregate presence information including the presence information, the presence information having a same attribute value and the same searched subscriber identification;

specifying the subscriber identification in the aggregate presence information including the presence information, the presence information having a same attribute value as the attribute value included in the presence information received from a client specified by a new buddy identification not stored in the notification recipient management table;

storing the new buddy identification and the specified subscriber identification to the notification recipient management table;

generating the aggregate presence information based on the notification recipient management table that stores the new buddy identification; and transmitting the generated aggregate presence information to the client specified by the subscriber identification.

\* \* \* \* \*